United States Patent
Chinomi et al.

(10) Patent No.: US 7,054,740 B2
(45) Date of Patent: May 30, 2006

(54) CONTENT PROVIDING AREA PRESENTATION SYSTEM

(75) Inventors: Satoshi Chinomi, Yokohama (JP); Takuo Ishiwaka, Yokohama (JP); Toru Takagi, Yokohama (JP); Susumu Fujita, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 259 days.

(21) Appl. No.: 10/645,619

(22) Filed: Aug. 22, 2003

(65) Prior Publication Data
US 2004/0059498 A1 Mar. 25, 2004

(30) Foreign Application Priority Data
Sep. 19, 2002 (JP) .............................. 2002-272720
Jul. 1, 2003 (JP) .............................. 2003-189553

(51) Int. Cl.
*G01C 21/26* (2006.01)
(52) U.S. Cl. ...................... 701/200; 701/213; 701/207; 701/208; 340/995.14
(58) Field of Classification Search ........ 701/200–213; 455/12.1, 13.2, 18, 412.1; 340/990–996; 342/357.01–357.13
See application file for complete search history.

(56) References Cited

U.S. PATENT DOCUMENTS

| 6,411,891 | B1 * | 6/2002 | Jones .......................... 701/201 |
| 6,836,724 | B1 * | 12/2004 | Becker et al. .............. 701/200 |
| 6,909,398 | B1 * | 6/2005 | Knockeart et al. ..... 342/357.14 |
| 6,917,878 | B1 * | 7/2005 | Pechatnikov et al. ....... 701/210 |
| 2002/0016162 | A1 | 2/2002 | Yoshihara et al. |

FOREIGN PATENT DOCUMENTS

| JP | 11-272711 A | 10/1999 |
| JP | 2002-049766 A | 2/2002 |

* cited by examiner

*Primary Examiner*—Richard M. Camby
(74) *Attorney, Agent, or Firm*—Shinjyu Global IP Counselors

(57) ABSTRACT

A content providing area presentation system is configured to present content providing area candidates to enable a user to readily select an appropriate content providing area when at least one of the content providing area candidates is presented to the user. The content providing area presentation system comprises a user inputting section and a displaying section. The user inputting section is configured and arranged to request content providing area candidates for presenting at least one of the content providing area candidates to a user based on a selection criterion. The displaying section is configured and arranged to display the at least one of the content providing area candidates in response to the selection criterion established by the user inputting section.

19 Claims, 22 Drawing Sheets

CONTENT PROVIDING AREA PRESENTATION SYSTEM

BACKGROUND OF THE INVENTION

1. Field of the Invention

The present invention relates to a content providing area presentation system that is configured and arranged to present at least one content providing area candidate on a navigation screen of a user terminal utilized by a user upon an issuance of a request from the user to acquire the content. The content is distributed to the user terminal of the user from a content server over a network.

2. Background Information

Two known methods for downloading content to a user terminal by connecting the user terminal to the internet through a dialup circuit are the simultaneous viewing method and the advance storage method. With the advance storage method, the content is obtained from a content server via a network in response to a request issued by the user. The content is temporarily stored in advance in a cache server arranged in a location close to a mobile terminal of the user. Then, the content is downloaded at a desired timing from the cache server to the mobile terminal. The advantage of the advance storage method over the simultaneous viewing method is that the connection time is shorter because the content is stored in the cache server in advance.

Examples of content providing methods utilizing the advance storage method are described in Japanese Laid-Open Patent Publication No. 2002-49766 and Japanese Laid-Open Patent Publication No. 11-272711.

In view of the above, it will be apparent to those skilled in the art from this disclosure that there exists a need for an improved content providing area presentation system. This invention addresses this need in the art as well as other needs, which will become apparent to those skilled in the art from this disclosure.

SUMMARY OF THE INVENTION

It has been discovered that, with the conventional content providing area presentation system, when the user selects or decides a location (content providing area) to receive the content, the user is not always familiar with the surroundings or the neighborhood of the content providing area. Therefore, with the conventional content providing area presentation system, the user may have difficulty in determining how or on what criteria to select a content providing area when the user is in an unfamiliar place where the user does not know the surroundings or the neighborhood.

Moreover, with the conventional content providing area presentation system, even if the user is in a region where the user is familiar with the surroundings or neighborhood, selecting the best content providing area from a list of several content providing area candidates can be very difficult when the region has many possible content providing area candidates.

Furthermore, with the conventional content providing area presentation system, there has also been the problem that the user arrives at the content providing area only to find that it will take time for the requested processing (content downloading) to be completed because the requested content cannot yet be distributed or the concentration of processing being executed at the content providing area has exceeded the network capacity. Also, it is sometimes a problem that the parking lot at the content providing area is sometimes full and there is nowhere for the user to park his or her car.

Moreover, with the conventional content providing area presentation system, even when content providing area candidates are recommended by the content providing area presentation system, the user typically does not know why those locations were recommended. Therefore, the user would have a difficult time deciding which of the recommended content providing areas to select.

The object of the present invention is to provide an improved content providing area presentation system that presents content providing area candidates to a user in such a manner that the user can easily decide which location is the most appropriate content providing area for the user.

In order to achieve this object, a content providing area presentation system is provided that comprises a user inputting section and a displaying section. The user inputting section is configured and arranged to request content providing area candidates for presenting at least one of the content providing area candidates to a user based on a selection criterion. The displaying section is configured and arranged to display the at least one of the content providing area candidates in response to the selection criterion established by the user inputting section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
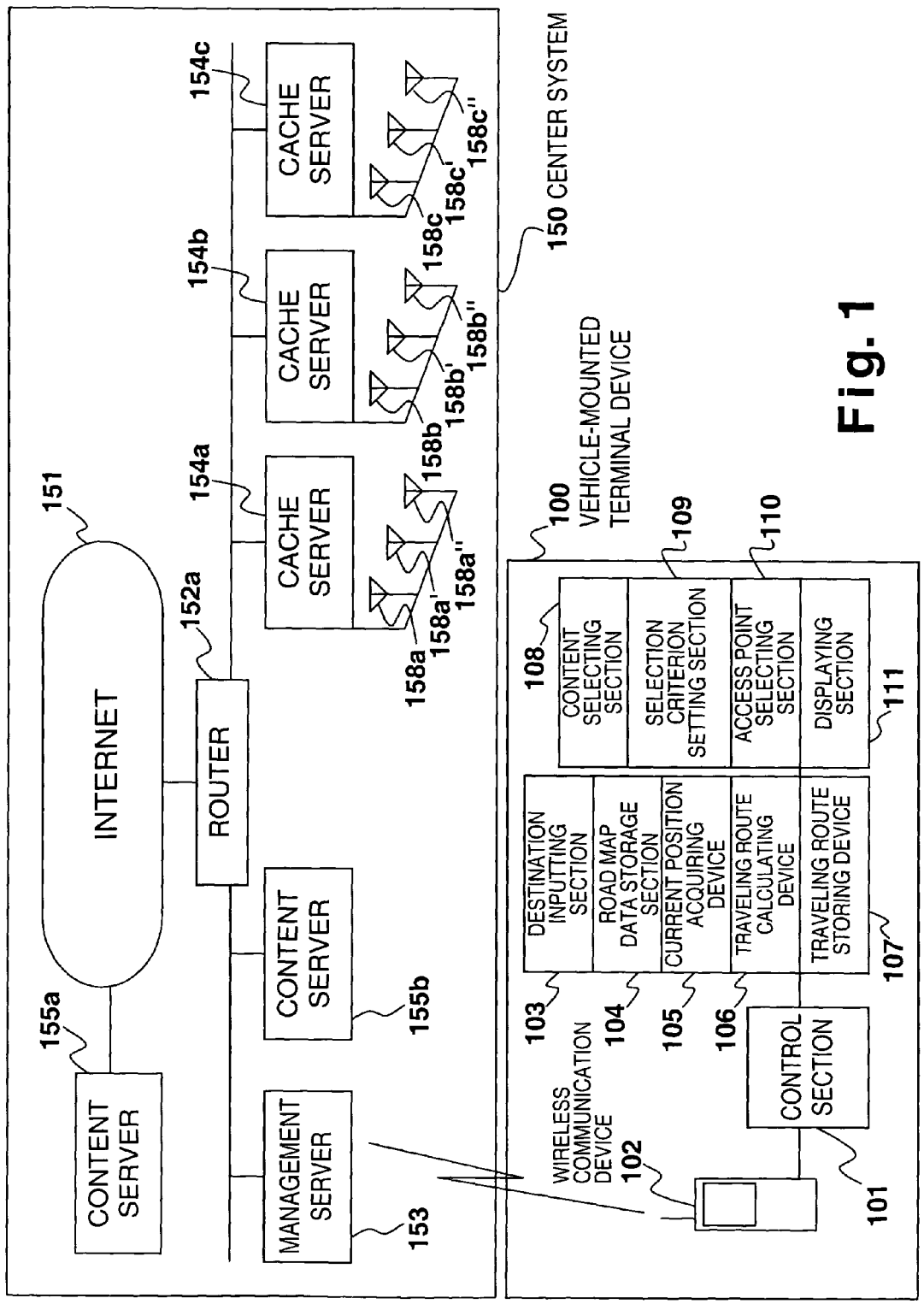
FIG. 1 is a system block diagram showing constituent features of a content providing area presentation system in accordance with a first embodiment of the present invention.

Referring initially to FIGS. 1–4, a content providing area presentation system is illustrated in accordance with a first embodiment of the present invention. FIG. 1 is a system block diagram showing the constituent features of the content providing area presentation system in accordance with the first embodiment of the present invention. The content providing area presentation system basically comprises a vehicle-mounted terminal device 100 and a center system 150.

The vehicle-mounted terminal device 100 basically comprises a control device or section 101, a wireless communication device or section 102, a destination inputting device or section 103, a road map data storage section 104, a current position acquiring device or section 105, a traveling route calculating device or section 106, a traveling route storing device or section 107, a content selecting device or section 108, a selection criterion setting device or section 109, an access point selecting device or section 110, and a displaying device or section 111. The vehicle-mounted terminal device 100 is configured and arranged to accesses a management server 153 of the center system 150 through the wireless communication device 102. The control section 101 is configured and arranged to control the entire vehicle-mounted terminal device 100.

More specifically, the control section 101 preferably includes a microcomputer with a control program that controls the vehicle-mounted terminal device 100 as discussed below. The control section 101 can also include other conventional components such as an input interface circuit, an output interface circuit, and storage devices such as a ROM (Read Only Memory) device and a RAM (Random Access Memory) device. The microcomputer of the control section 101 is programmed to control the vehicle-mounted terminal device 100. It will be apparent to those skilled in the art from this disclosure that the precise structure and algorithms for the control section 101 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Among the components of the vehicle-mounted terminal device 100, the destination inputting section 103, road map data storage section 104, the current position acquiring device 105, the traveling route calculating device 106, the traveling route storing device 107, and the displaying section 111 are preferably constructed as part of a navigation device mounted on the vehicle. More specifically, the destination inputting section 103 is configured and arranged to input a destination selected by the user to the vehicle-mounted terminal device 100. The road map data storage section 104 is configured and arranged to store road map data. The current position acquiring device 105 is configured and arranged to acquire the current position of the vehicle in a conventional manner, e.g. GPS system. The traveling route calculating device 106 is configured and arranged to calculate a traveling route from the current position of the vehicle to the selected destination based on the road map data. The traveling route storing device 107 is configured and arranged to store the traveling route calculated in the traveling route calculating device 106. The displaying section 111 is configured and arranged to display the traveling route stored in the traveling route storing device 107 on a map based on the road map data. Of course, it will be apparent to those skilled in the art from this disclosure that these components can also be configured as a dedicated device or combination of devices to achieve their functions instead of using an established navigation device.

The content selecting section 108 of the vehicle-mounted terminal device 100 is configured and arranged to present a list of contents that can be downloaded, e.g., music or movie, to a user of the vehicle-mounted terminal device 100. The content selecting section 108 is further configured and arranged to receive input data (content requests) from the user when the user selects desired content that the user wishes to download. The content selecting section 108 is preferably operatively coupled to a microcomputer and a display or other presenting device and includes input buttons (e.g., a key pad, a touch screen, pointing device etc.).

The selection criterion setting section 109 is configured and arranged to receive input data when the user inputs a desired selection criterion that is used to select a content providing area (content receiving location) where the user desires to receive the content. The selection criterion setting section 109 is preferably includes input buttons (e.g., a key pad, a touch screen, pointing device etc.) and operatively coupled to a display or other presenting device.

The access point selecting section 110 is configured and arranged to receive an input data when the user selects a desired content providing area from content providing area candidates displayed on the displaying section 111. The access point selecting section 110 is preferably includes input buttons (e.g., a key pad, a touch screen, pointing device etc.) and a display or other presenting device.

A user inputting section is formed by the content selecting section 108, the selection criterion setting section 109 and the access point selecting section 110. The user inputting section can be integrated into the displaying section 111 or a separate component. For example, the user inputting section can include buttons on the display of the displaying section 111, or can be a separate input device such as a key pad or pointing device.

As seen in FIG. 1, the center system 150 is operatively coupled to the internet 151. Thus, the internet 151 forms a part of the center system 150. The center system 150 basically comprises a router 152a, a management server 153, a pair of content servers 155a and 155b, a plurality of cache servers (only cache servers 154a, 154b and 154c are shown), and a plurality of wireless access points (only wireless access points 158a, 158a', 158a", 158b, 158b', 158b", 158c, 158c', and 158c" are shown). The wireless access points 158a–158a", 158b–158b" and 158c–158c" are connected to the cache servers 154a, 154b and 154c, respectively, and arranged in a geographically distributed manner. The cache servers 154a, 154b and 154c, and the management server 153 are connected to the internet 151 through the router 152a. The content server 155a is also preferably directly connected to the internet 151. Of course, it will be apparent to those skilled in the art from this disclosure that the content server 155a can also be arranged to exist on the same network as the management server 153 such as the content server 155b shown in FIG. 1. Both of the content servers 155a and 155b are not needed to carry out the present invention. Moreover, it is also acceptable for the management server 153 to be configured to be divided into a several devices or sections according to functions of the management server 153.

Here, each of facilities or areas where each of the wireless access points 158a, 158a', 158a", 158b, 158b', 158b", 158c, 158c', and 158c" is established are referred as a "content providing area". Moreover, since a content providing area is where the user receives or downloads the content, "content providing area" is equivalent to "content receiving area" or "content receiving location". Therefore, these terms can be used interchangeably to each other.

The content providing area presentation system of the present invention is configured and arranged to present one or more content providing area candidates to the user upon receiving a content request for the content from the user. More specifically, the content providing area presentation system of the present invention is configured and arranged to present the content providing area candidates in accordance with a selection criterion established by the user. Thus, the user can easily decide which area is suitable for receiving the content without being perplexed by the content providing area candidates that are presented.

After the user select a content providing area, the content is distributed to a cache server to which a wireless access point corresponding to the selected content providing area is connected. The user downloads the content temporarily stored in the cache server through the wireless access point at the selected content providing area.

In the first embodiment of the present invention, a selection criterion for the content providing area is preferably based on traveling route information. More specifically, the selection criterion is preferably set to "increase in travel distance" by the user. When the "increase in travel distance" criterion is established by the user, a list of the content providing area candidates is presented to the user in which the content providing area candidates are listed in the order from a location for which stopping at will result in the smallest increase in traveling distance with respect to the traveling route registered in the vehicle-mounted terminal device 100. Thus, when the content providing area candidates will be selected based on the traveling route information, the content providing area candidates are preferably presented in order from the content providing area having the shortest total traveling distance to the final destination.

The list of content providing area candidates presented based on the selection criterion established by the user is referred as "special recommendation information". Moreover, the special recommendation information is analogous to a "content providing area special recommendation list", and thus, these terms can be used interchangeably.

Figure 2:
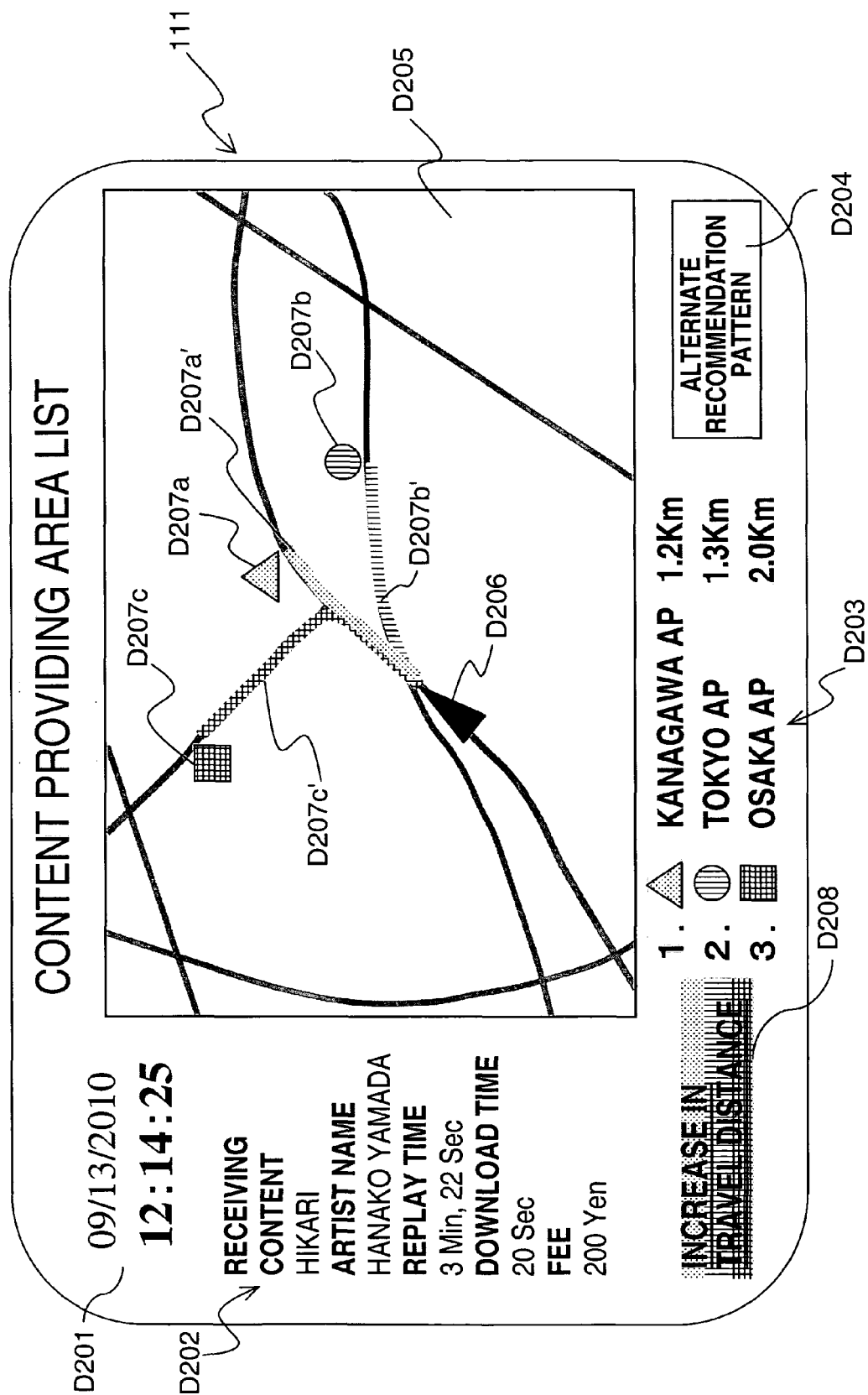
FIG. 2 is a diagrammatic view of a displaying section of a vehicle-mounted terminal device of the content providing area presentation system in accordance with the first embodiment of the present invention.

FIG. 2 is a diagrammatic view of one example of the displaying section 111 of the vehicle-mounted terminal device 100 in accordance with the first embodiment of the present invention. The control section 101 of the vehicle-mounted terminal device 100 is configured and arranged to display a content providing area selection screen on the displaying section 111. When the content providing area selection screen is displayed, the following display items are preferably arranged to appear on the displaying section 111: a current time D201, properties of a requested content D202, special recommendation information D203, a special recommendation information cancel button D204, a map D205, and selection criterion information D208. In FIG. 2, three content providing area candidates are provided in the special recommendation information D203. Of course, it will be apparent to skilled in the art from this disclosure that the number of the content providing area candidates will vary based on various conditions and situations. In the first embodiment of the present invention, the special recommendation information D203 is also arranged to include an additional traveling distance for each of the content providing area candidates. The additional traveling distance is a distance that will result from deviating from a preselected travel route in order to stop at the content providing area. Thus, this distance information can be used as a reference when the user selects the content providing area from the content providing area candidates. Then, the user will select the desired content providing area from the special recommendation information D203.

In the first embodiment, the special recommendation information D203 is arranged to list the content providing area candidates in the order from the location for which stopping will result in the smallest increase in traveling distance with respect to the traveling route registered in the vehicle-mounted terminal device 100, as explained above. However, when the user does not wish to stop by any of the content providing area candidates listed in the special recommendation information D203, the user can cancel the special recommendation information D203 by selecting the special recommendation information cancel button D204 on the displaying section 111. When the special recommendation information cancel button D204 is selected, the control section 101 of the vehicle-mounted terminal device 100 is configured and arranged to display content providing area candidates in order from the closest location to the farthest location in terms of straight-line distance from the current position of the vehicle. The term "straight-line distance" as used herein means the route requiring shortest distance to travel form the current vehicle location to the selected location based on the known routes available to the system.

The map D205 is preferably a map of the area surrounding the vehicle. Moreover, the map D205 is preferably configured and arranged to include a vehicle icon D206 indicating the current position of the vehicle, and a plurality of content providing area candidate icons D207*a*, D207*b* and D207*c* indicating a location for each of the content providing area candidates listed in the special recommendation information D203. The vehicle icon D206 and the content providing area icons D207*a*, D207*b* and D207*c* are connected by guide lines D207*a'*, D207*b'* and D207*c'*, respectively. These guide lines D207*a'*, D207*b'* and D207*c'* are indicative of guide routes from the current position of the vehicle (the vehicle icon D 206) to the locations of the corresponding content providing areas (the content providing area icons D207*a*, D207*b* and D207*c*). The vehicle icon D 206, the content providing area icons D207*a*, D207*b* and D207*c*, and the guide lines D207*a'*, D207*b'* and D207*c'* in the map D205 can be used as additional or supplemental information regarding the content providing area candidates in selecting the content providing area where the user wishes to receive the content.

The selection criterion information D208 is configured and arranged to indicate the selection criteria established by the user on which the order of the content providing area candidates in the special recommendation information D203 is based, e.g., "Increase In Travel Distance". In the first embodiment of the present invention, since the content providing area candidates are listed based on the increase in traveling distance, the selection criterion information D208 is preferably arranged to use the same colors used with the content providing area icons D207*a*, D207*b*, and D207*c* and the guide lines D207*a'*, D207*b'* and D207*c'* so that these items stand out as being related to each other. More specifically, the content providing area icon D207*a* and the guide line D207*a'* are preferably arrange to use the same color indicated as ▓ in FIG. 2. The content providing area icon D207*b* and the line D207*b'* are preferably arranged to use a different color from the content providing area icon D207*a* and the guide line D207*a'* indicated as ▒ in FIG. 2. Likewise, the content providing area icon D207*c* and the line D207*c'* are preferably arranged to use a different from the colors of the content providing area icons D207*a* and D207*b* and the guide lines D207*a'* and D207*b'* indicated as ▓ in FIG. 2. The selection criterion information D208 is preferably arranged to use the colors used in the content providing area icons D207*a*, D207*b* and D207*c*, and the lines D207*a'*, D207*b'* and D207*c'*, as shown in FIG. 2. Of course, it will be apparent to those skilled in the art from this disclosure that various methods to indicate the relationship between the selection criterion information D208, the content providing area icons D207*a*, D207*b* and D207*c*, and the lines D207*a'*, D207*b'* and D207*c'*. For example, other methods can be joining these items with a line, underlining these items with the same color, and attaching an identical icon to both items. Such methods allow related information to be recognized at a glance and are convenient when the user selects a content providing area from the content providing area candidates listed in the special recommendation information D203.

Figure 3:
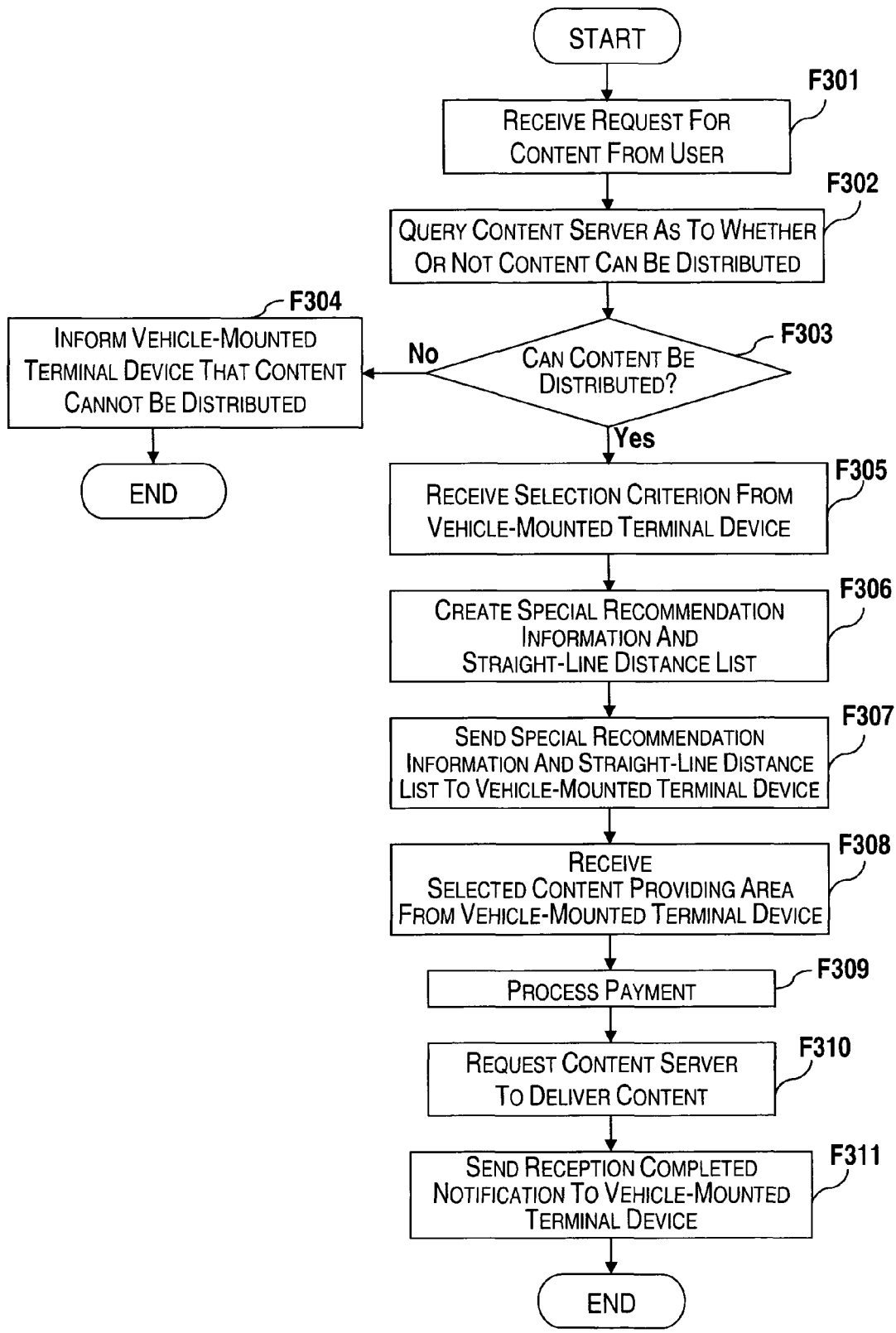
FIG. 3 is a flowchart showing information processing steps executed by a center system of the content providing area presentation system in accordance with the first embodiment of the present invention.

Referring to FIG. 3, the processing flow of the center system 150 will now be described. FIG. 3 is a flowchart showing the information processing steps executed by the center system 150 in accordance with the first embodiment of the present invention.

First, in step F301, the management server 153 of the center system 150 is configured and arranged to receive a content request for the content from the vehicle-mounted terminal device 100. Then, in step F302, the management server 153 is further configured and arranged to query the content server 155*a* or 155*b* regarding whether or not the requested content can be distributed. If the content server 155*a* or 155*b* informs to the management server 153 that it is not possible to distribute the content in step F303, the management server 153 is configured and arranged to inform the vehicle-mounted terminal device 100 that the content cannot be distributed in step F304.

If the management server 153 is informed in step F303 that the requested content is possible to be distributed, the management server 153 is configured and arranged to receive the selection criterion for the content providing area candidates, the current position of the vehicle and the traveling route from the vehicle-mounted terminal device 100 in step F305. More specifically, in the first embodiment of the present invention, the management server 153 is configured and arranged to receive the selection criterion "increase in the travel distance" that is established by the user. Then, the management server 153 is configured and arranged to create special recommendation information based on the received selection criterion in step F306. In the first embodiment of the present invention, since the "increase in the traveling distance" is established by the user, the special recommendation information is a list of the content providing area candidates listed based on the increase in traveling distance. At the same time, in step F306, the management server 153 is also configured and arranged to create a straight-line distance list that lists the content providing area candidates in order from the shortest straight-line distance to the farthest straight-line distance from the current position of the vehicle requesting the content.

Next, the management server 153 is configured and arranged to report the special recommendation information created in step F306 to the vehicle-mounted terminal device 100 in step F307. Then, in step F308, the management server 153 is configured and arranged to receive a result of the selection of the content providing area by the user from the vehicle-mounted terminal device 100. In step F309, a payment processing operation is executed in which the management server 153 is configured to arrange the payment by the user for downloading the content. In step F310, the management server is configured and arranged to request the content server 155*a* or 155*b* to distribute the content to a cache server to which a wireless access point corresponding to the selected content providing area is connected. Then, in step F311, the management server 153 is configured and arranged to send a notification to the vehicle-mounted terminal 100 informing that reception of the request by the user has been completed.

Figure 4:
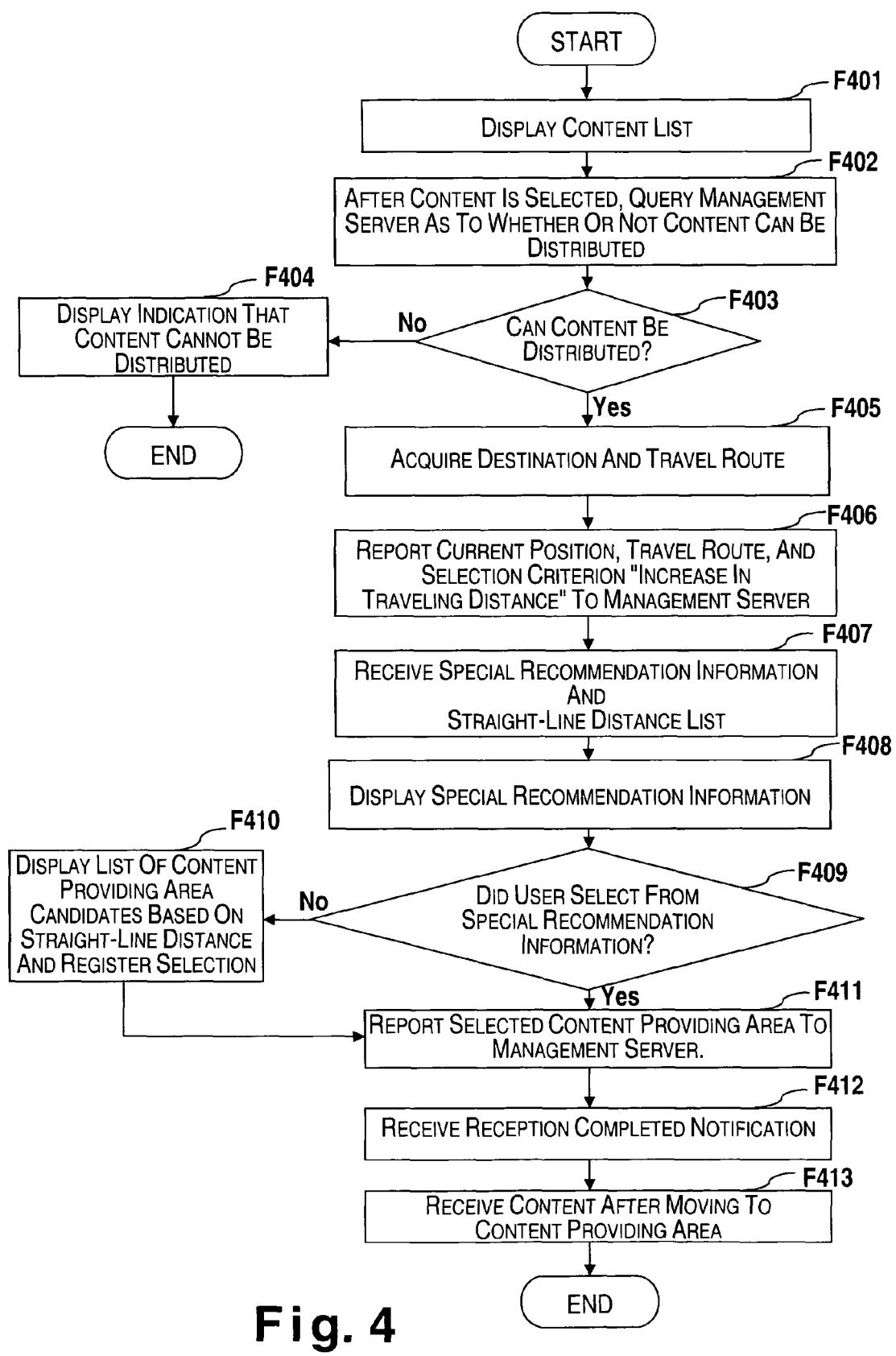
FIG. 4 is a flowchart showing information processing steps executed by the vehicle-mounted terminal device of the content providing area presentation system in accordance with the first embodiment of the present invention.

Next, the processing flow of the vehicle terminal device 100 is explained referring to FIG. 4. FIG. 4 is a flowchart showing the information processing steps executed by the vehicle-mounted terminal device 100 in accordance with the first embodiment of the present invention.

First, in step F401 of FIG. 4, the vehicle-mounted terminal device 100 is configured and arranged to display a content list on the displaying section 111 of the vehicle-mounted terminal device 100. The user selects the desired content from the content list displayed on the displaying section 111. After the content has been selected, the vehicle-mounted terminal device 100 is configured and arranged to query the management server 153 as to whether or not the selected content can be distributed in step F402.

If the vehicle-mounted terminal device 100 receives a notification from the management server 153 that the requested content cannot be distributed in step F403, the vehicle-mounted terminal device 100 is configured and arranged to display an indication that the content cannot be distributed in step F404.

If the vehicle-mounted terminal device 100 is notified that the requested content can be distributed in step F403, the vehicle-mounted terminal device 100 is configured and arranged to acquire the destination and traveling route to the destination in step F405. In step F406, the vehicle-mounted terminal device 100 is further configured and arranged to inform the management server 153 what selection criterion has been established by the user. More specifically, in the first embodiment of the present invention, the vehicle-mounted terminal device 100 is configured and arranged to inform the management server 153 that the selection criterion is to minimize the increase in traveling distance resulting from stopping at the content providing area. Simultaneously in step F406, the vehicle-mounted terminal device 100 is configured and arranged to also report the current position and traveling route to the destination to the management server 153. The current position is obtained from the current position acquiring device 105, and the traveling route is calculated by the traveling route calculating device 106 and stored in the traveling route storing device 107 of the vehicle-mounted terminal device 100.

As explained above, based on the current position, destination and traveling route of the vehicle that is requesting the content, the management server 153 is configured and arranged to create special recommendation information that lists the content providing area candidates in order from the location for which stopping at will result in the smallest increase in traveling distance of the user's current route. Moreover, the management server 153 is configured and arranged to create a straight-line distance list that lists the content providing area candidates in order from the closest location to the farthest location relative to the vehicle requesting the content in terms of straight-line distance (step F306 in FIG. 3). The management server 153 then sends the special recommendation information and the straight-line distance list to the vehicle-mounted terminal device 100 (step F307 in FIG. 3).

In step F407, the vehicle-mounted terminal device 100 is configured and arranged to receive the special recommendation information and the straight-line distance list created in the management server 153. Then, in step F408, the vehicle-mounted terminal device 100 is configured and arranged to display the special recommendation information as the special recommendation information D203 on the displaying section 111 as shown in FIG. 2.

If the user presses the special recommendation information cancel button D204 without selecting from the special recommendation information D203 displayed on the displaying section 111, in step F410, the vehicle-mounted terminal device 100 is configured and arranged to display the content providing area candidates based on the straight-line distance list received in step F407 on the displaying section 111.

When the user selects the content providing area from the special recommendation information in step F409 or from the straight-line distance list in step F410, the vehicle-mounted terminal device 100 is configured and arranged to notify the management server 153 which content providing area was selected by the user in step F411.

In step F412, the vehicle-mounted terminal device 100 is configured and arranged to receive the reception completed notification from the management server 153. The vehicle-mounted terminal device 100 is configured and arranged to end the processing when the vehicle goes to the selected content providing area and receives the content at the content providing area in step F413.

Accordingly, the content providing area presentation system in accordance with the first embodiment of the present invention enables the user to obtain information regarding the content providing areas before selecting a content providing area. Therefore, the content providing area presentation system of the first embodiment enables the user to select an appropriate content providing area for receiving the content. In particular, in the first embodiment makes it possible to minimize the change in the traveling route (i.e., minimize the increase in traveling distance) registered in the vehicle-mounted terminal device 100 that will occur if the user stops by the content providing area.

In the first embodiment, the selection criterion is selected such that the content providing area candidates are listed based on shortness of traveling distance. Alternatively, it will be apparent to those skilled in the art from this disclosure that it is also acceptable to use shortness of traveling time as the selection criterion for the content providing area.

In such a case, when the vehicle-mounted terminal device 100 is notified that the desired content can be distributed in step F403, the vehicle-mounted terminal device 100 is configured and arranged to notify the management server 153 that the selection criterion is to minimize the increase in traveling time resulting from stopping at the content providing area in step F406. Simultaneously in step F406, the vehicle-mounted terminal device 100 is configured and arranged to report to the management server 153 the current position and the traveling route obtained in step F405. Based on the destination and traveling route of the vehicle that is requesting the content, the management server 153 is configured and arranged to create special recommendation information that lists the content providing area candidates in order from the location for which stopping at will result in the smallest increase in traveling time. Then the management server 153 is configured and arranged to send the special recommendation information to the vehicle-mounted terminal device 100. This arrangement would make it possible to minimize the increase in traveling time with respect to the traveling route registered in the vehicle-mounted terminal device 100 that would occur if the user stopped by the content providing area.

Accordingly, the traveling distance and traveling time are included in the traveling route information mentioned in the claims.

Second Embodiment

Figure 5:
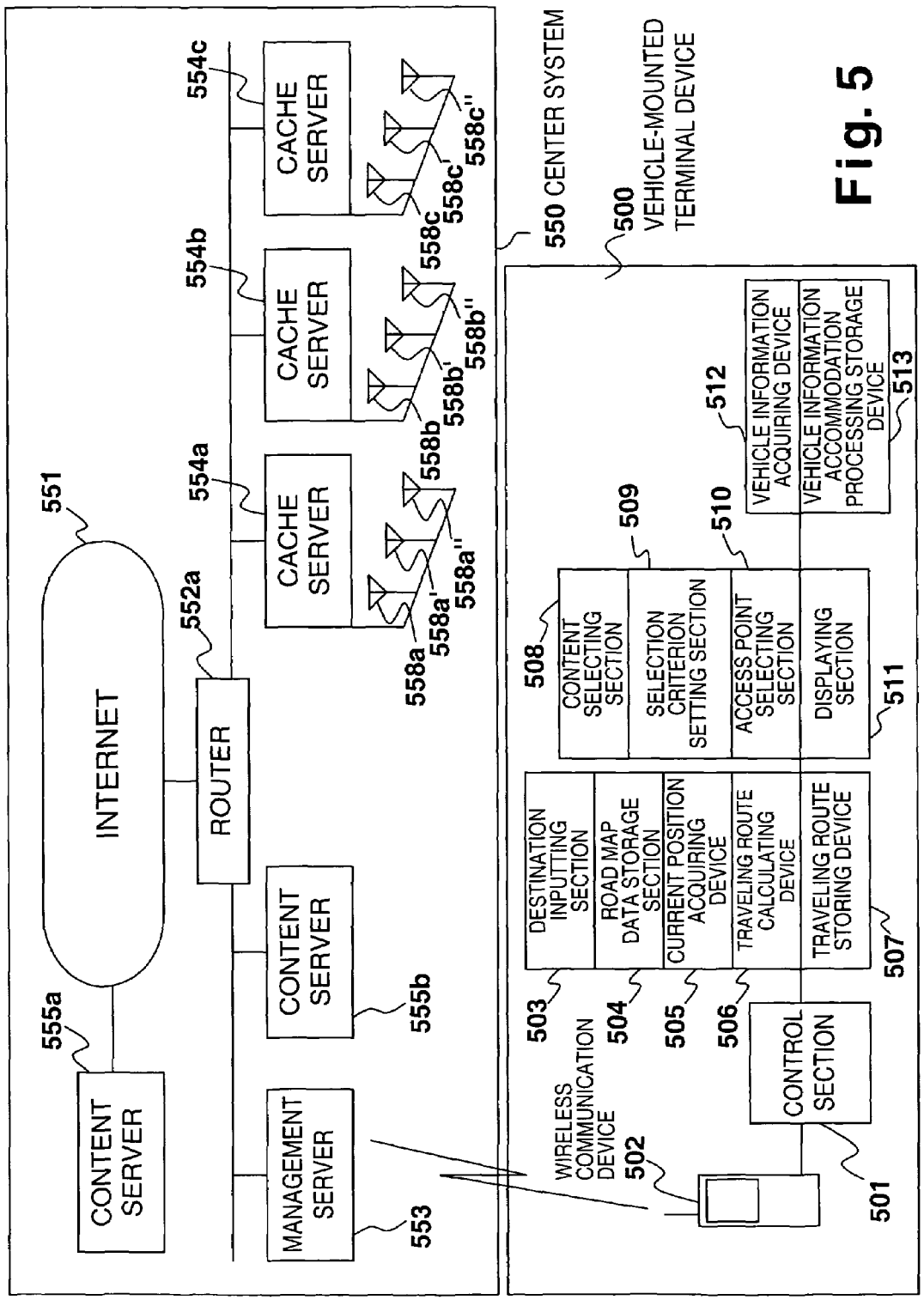
FIG. 5 is a system block diagram showing constituent features of a content providing area presentation system in accordance with a second embodiment of the present invention.
Figure 6:
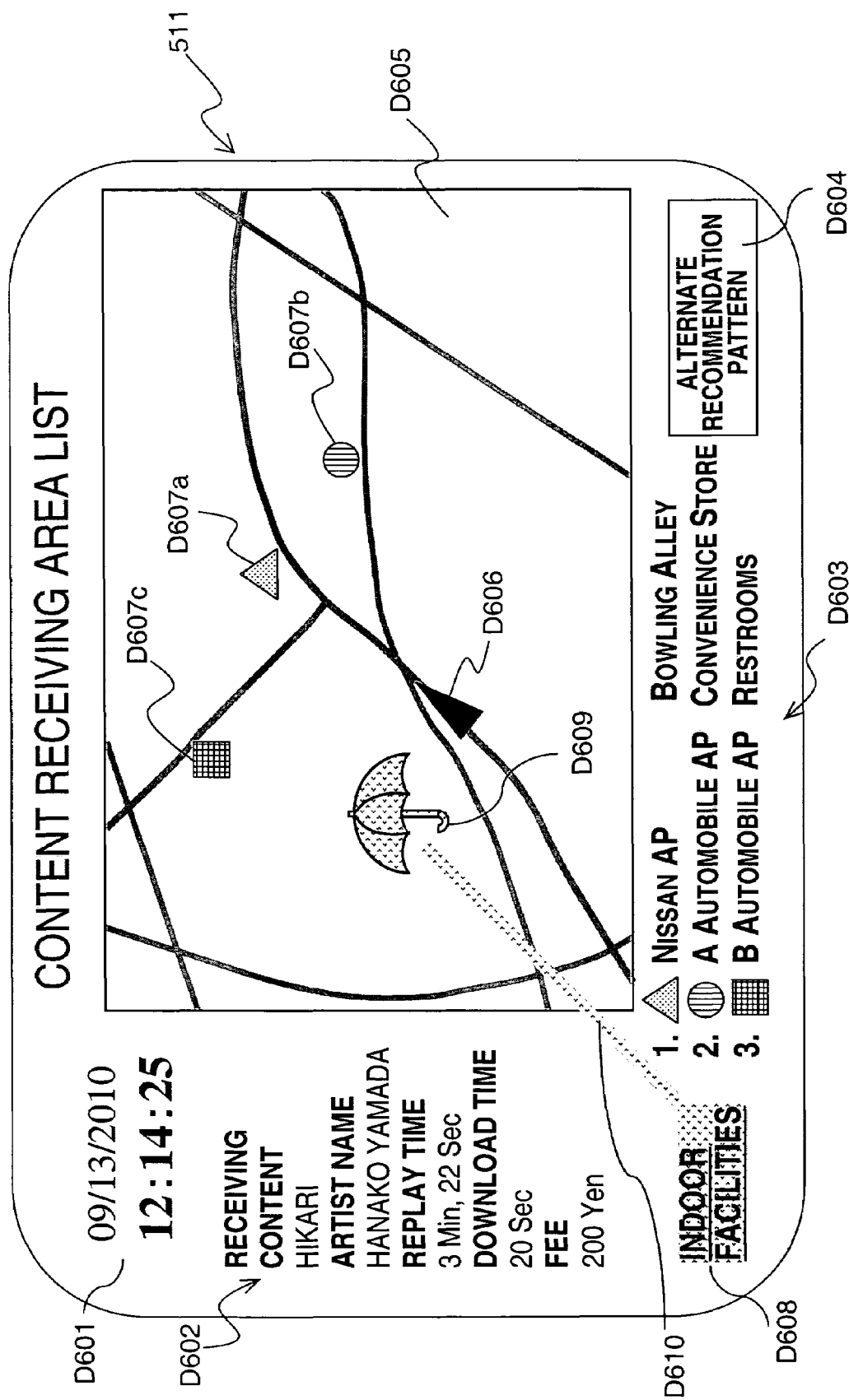
FIG. 6 is a diagrammatic view of a displaying section of a vehicle-mounted terminal device of the content providing area presentation system in accordance with the second embodiment of the present invention.
Figure 7:
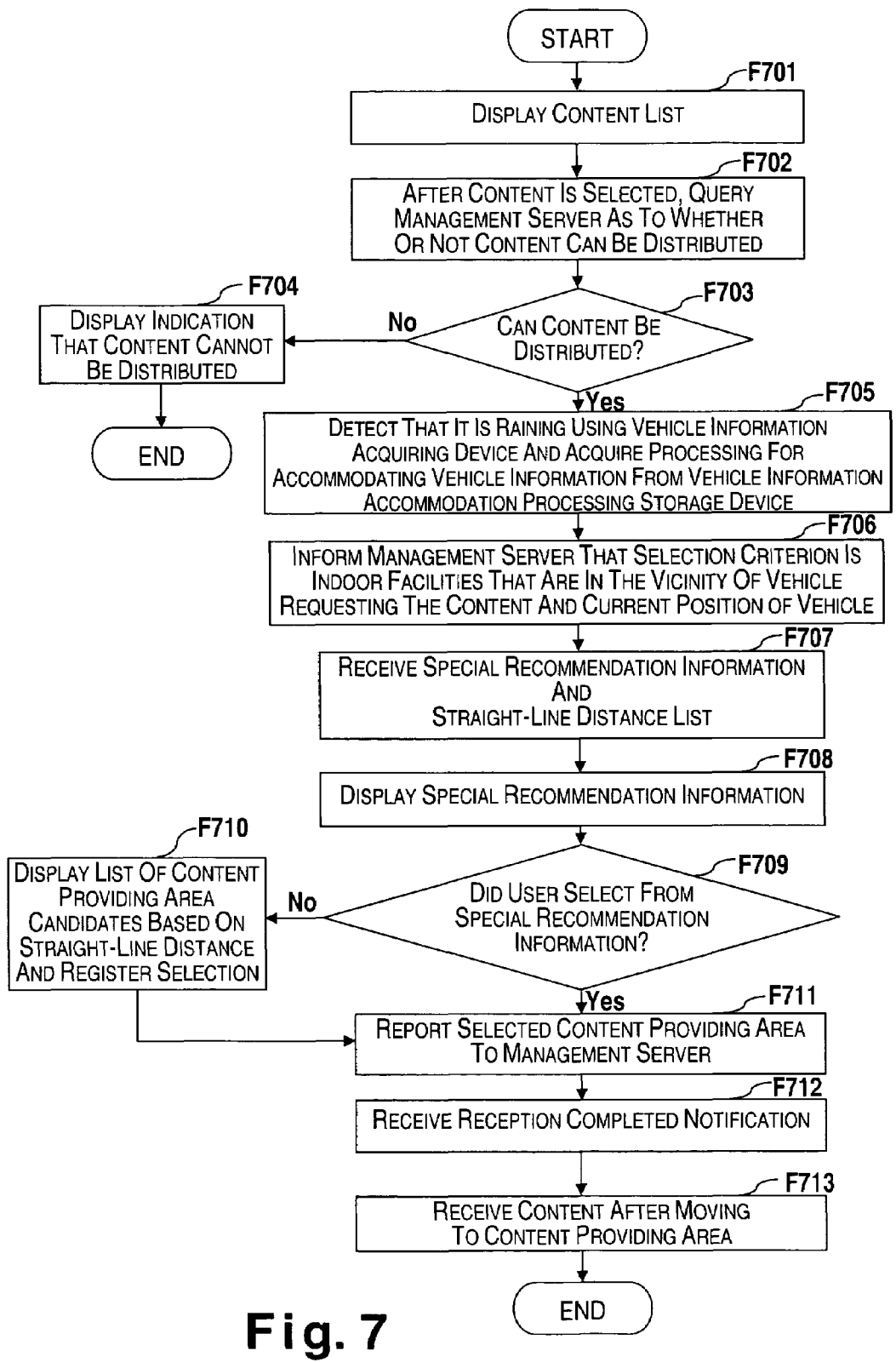
FIG. 7 is a flowchart showing information processing steps executed by the vehicle-mounted terminal device of the content providing area presentation system in accordance with the second embodiment of the present invention.

Referring now to FIGS. 5–7, a content providing area presentation system in accordance with a second embodiment of the present invention will be explained. In view of the similarity between the first and second embodiments, the descriptions of the parts of the second embodiment that are identical to the parts of the first embodiment may be omitted for the sake of brevity.

FIG. 5 is a system block diagram showing the main features of a content providing area presentation system in accordance with the second embodiment of the present invention. The content providing area presentation system of the second embodiment differs from the first embodiment in that the vehicle-mounted terminal device 100 is replaced with a vehicle-mounted terminal device 500. More specifically, the vehicle-mounted terminal device 500 differs from the vehicle-mounted terminal device 100 in that the vehicle-mounted terminal device 500 is provided with a vehicle information acquiring device 512 and a vehicle information accommodation processing storage device 513 connected thereto. The configuration of a center system 550 of the second embodiment is the same as the center system 150 in the first embodiment.

In the content providing area presentation system in accordance with the second embodiment, the vehicle information acquiring device 512 of the vehicle-mounted terminal device 500 is configured and arranged to obtain vehicle information that is indicative of a current condition of the vehicle. More specifically, in this second embodiment of the present invention, the vehicle information acquiring device 512 is preferably configured and arranged to detect whether windshield wipers of the vehicle are being operated. When the windshield wipers are being operated, the vehicle information acquiring device 512 is further configured and arranged to determine that it is raining (rainy weather) in the area of the vehicle. The vehicle information accommodation processing storage device 513 of the vehicle-mounted terminal device 500 is configured and arranged to extract a type of content providing area that is suited to the current condition of the vehicle. More specifically, in this second embodiment, the vehicle information accommodation processing storage device 513 is preferably configured and arranged to extract a type of content providing area that is suited to rainy weather when the vehicle information acquiring device 512 determines that it is raining in the area of the vehicle. In particular, the vehicle information accommodation processing storage device 513 is preferably configured and arranged to store an indoor facility as a type of content providing area that is suited to a rainy weather.

In the content providing area presentation system in accordance with the second embodiment, when a request for the content is issued from the vehicle-mounted terminal device 500 and the vehicle is traveling in the rain, the selection criterion is set to "list content providing area candidates in accordance with the vehicle information".

FIG. 6 is a diagrammatic view of an example of a displaying section 511 of the vehicle-mounted terminal device 500 in accordance with the second embodiment. As shown in FIG. 6, the following display items are provided on the content providing area selection screen of the second embodiment: a current time D601, properties of a requested content D602, special recommendation information D603, a special recommendation information cancel button D604, a map D605 and selection criterion information D608.

In the second embodiment of the present invention, the selection criterion is set to list the content providing area candidates in accordance with the vehicle information. Therefore, the content providing area candidates that are indoor facilities are listed when the vehicle information acquiring device 512 detects that it is raining. Moreover, the selection criterion information D608 is configured to indicate the type of content providing area candidates listed in the special recommendation information D603, e.g., "Indoor Facilities". Furthermore, as seen in FIG. 6, the selection criterion information D608 is preferably joined by a line D610 to an umbrella mark D609 to indicate that it is raining and emphasize the relation between the content providing area candidates listed in the special recommendation information D603 and the fact that it is raining. This arrangement allows related information to be recognized at a glance and is convenient when selecting a location of the content providing area. Of course, it will be apparent to those skilled in the art from this disclosure that other methods can be used to emphasize the relation between the content providing area candidates listed in the special recommendation information D603 and the fact that it is raining.

The content providing area is selected from the content providing area candidates listed in the special recommendation information D603. In the second embodiment of the present invention, the type of indoor facility, e.g., a bowling lane, a convenience store, or restrooms, is preferably displayed in addition to the content providing area (each of which is established in an indoor facility) in the special recommendation information D603. This information can be used as a reference or supplement in selecting a content providing area from the special recommendation information D603.

When the user does not want to stop by any of the displayed content providing areas, the user can press the special recommendation information cancel button D604 to cancel the special recommendation information D603. When the special recommendation information cancel button D604 is selected, a straight-line distance list that lists content providing area candidates in order from the closest location to the farthest location relative to the current position of the vehicle in terms of straight-line distance is displayed.

The map D605 is preferably a map of the area surrounding the current position of the vehicle. Moreover, as seen in FIG. 6, the map D605 is preferably configured and arranged to include a vehicle icon D606 indicating the current position of the vehicle, and a plurality of content providing area candidate icons D607a, D607b and D607c that indicate a location for each of the content providing area candidates. The vehicle icon D606 and the content providing area icons D607a, D607b and D607c in the map D605 can be used as additional or supplemental information regarding the content providing areas when the user selects the content providing area where the user wishes to receive the content.

Referring now to FIG. 7, the operation of the content providing area presentation system in accordance with the second embodiment of the present invention will be described. Since the processing flow of the center system 550 of the second embodiment is the same as that the processing flow of the center system 150 of the first embodiment shown in FIG. 3, only the processing flow of the vehicle-mounted terminal device 500 is described in FIG. 7.

First, in step F701 of FIG. 7, the vehicle-mounted terminal device 500 is configured and arranged to display a content list on the displaying section 511. The user selects the desired content from the displayed content list. After the content has been selected, the vehicle-mounted terminal device 500 is configured and arranged to query the management server 553 as to whether or not the selected content can be distributed in step F702.

If the vehicle-mounted terminal device 500 receives a notification from the management server 553 that the requested content cannot be distributed, the vehicle-mounted terminal device 500 is configured and arranged to display an indication that the content cannot be used in steps F703 and F704.

Since the selection criterion is set to list the content providing areas in accordance with the vehicle information, when the vehicle-mounted terminal device 500 is notified in step F703 that the requested content can be distributed, the vehicle-mounted terminal device 500 is configured and arrange to obtain the vehicle information based on the vehicle information acquiring device 512 and acquire processing to accommodate the current condition of the vehicle from the vehicle information accommodation processing storage device 513 in step F705. More specifically, in this second embodiment of the present invention, the vehicle information acquiring device 512 is preferably configured and arranged to determine whether it is raining or not in the area of the vehicle. Moreover, the vehicle-mounted terminal device 500 is preferably arranged and configured to acquire a type of the content providing area, e.g., an indoor facility, from the vehicle information accommodation processing storage device 513.

As explained above, the vehicle information acquiring device 512 is preferably connected to the wipers and configured to determine that it is raining when the wipers are in operation. Of course, it will be apparent to those skilled in the art from this disclosure that the vehicle information acquiring device is arranged to use a rain sensor or other device that can detect whether it is raining or not instead of the wipers.

In the second embodiment of the present invention, the processing that accommodates rainy weather established in the vehicle information accommodation processing storage device 513 is to guide the user to the content providing areas that are established in indoor facilities. In step F706, the vehicle-mounted terminal device 500 is configured and arranged to report to the management server 553 that the selection criterion is to list the content providing area candidates that are indoor facilities in the vicinity of the vehicle requesting the content along with the current position of the vehicle detected by a current position acquiring device 505 of the vehicle-mounted terminal device 500.

The management server 553 is configured and arranged to create the special recommendation information that lists content providing area candidates that are established in indoor facilities. Moreover, the management server 553 is also configured and arranged to create a straight-line distance list that lists content providing area candidates in order from the closest location to the farthest location relative to the vehicle requesting the content in terms of straight-line distance. The management server 553 is configured and arranged to send the special recommendation information and the straight-line distance list to the vehicle-mounted terminal device 500.

In step F707, the vehicle-mounted terminal device 500 is configured and arranged to receive the special recommendation information and the straight-line distance list. In step F708, the vehicle-mounted terminal device 500 is configured and arranged to display the special recommendation information in the displaying section D603 as shown in FIG. 6.

If the user does not select from the special recommendation information D603 displayed in the displaying section 511 and, instead, presses the special recommendation information cancel button D604 in step F709, then the straight-line distance list of the content providing area candidates is displayed in step F710.

When the user selects the content providing area from the special recommendation information in step F709 or from the straight-line distance list of content providing area candidates in step F710, the vehicle-mounted terminal device 500 is configured and arranged to notify the management server 553 which content providing area was selected in step F711.

In step F712, the vehicle-mounted terminal device 500 is configured and arranged to receive the reception completed notification from the management server 553. The vehicle-mounted terminal device 500 is configured and arranged to end the processing when the vehicle goes to the selected content providing area and receives the content at the content providing area in step F713.

Accordingly, the content providing area presentation system in accordance with the second embodiment of the present invention can obtain the vehicle information that is indicative of the current condition of the vehicle, which changes from time to time, before a driver of the user obtain the vehicle information. Then the content providing area presentation system of the second embodiment is configured to recommend content providing area candidates that anticipate the intentions of the driver or the user.

The content providing area presentation system of the second embodiment is configured and arranged to use a determination of rainy weather as the vehicle information. However, it will be apparent to those skilled in the art from this disclosure that any type of information indicative of the current condition can be used as the vehicle information, and a type of the content providing area that is suited to that current condition of the vehicle is stored in and acquired from the vehicle information accommodation processing storage device 513.

For example, the remaining amount of gasoline in the vehicle can be used as the vehicle information. More specifically, the content providing area presentation system in accordance with the second embodiment can be configured and arranged such that the vehicle-mounted terminal device 500 is configured and arranged to detect from the vehicle information acquiring device 512 that the fuel level is decreasing and acquire processing to accommodate a low fuel level from the vehicle information accommodation processing storage device 513. In such a case, the vehicle-mounted terminal device 500 is preferably configured and arranged to instruct the management server 553 that the selection criterion is to guide the vehicle to a content providing area established at a gas station. This arrangement allows the user to refill his or her gas tank while simultaneously receiving the content.

Accordingly, the rainy weather information and fuel level information are included in the "vehicle information" mentioned in the claims. Of course, the phrase "vehicle information" as used herein is not limited to the rainy weather information and fuel level information described above. Rather, it will be apparent to those skilled in the art from this disclosure that the phrase "vehicle information" includes other similar information pertaining to the vehicle that would be relevant to route or location selection.

Third Embodiment

Figure 8:
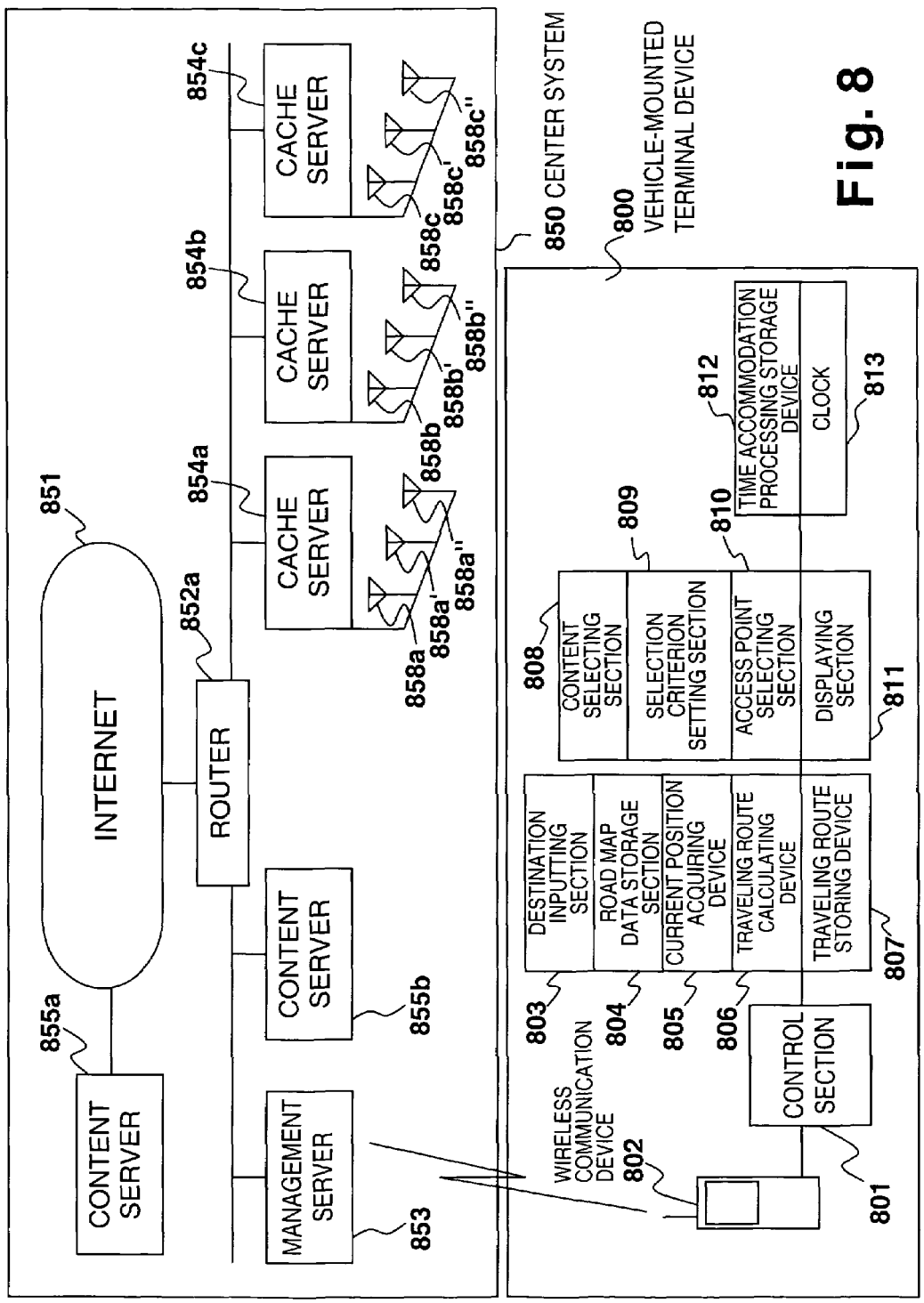
FIG. 8 is a system block diagram showing constituent features of a content providing area presentation system in accordance with a third embodiment of the present invention.
Figure 9:
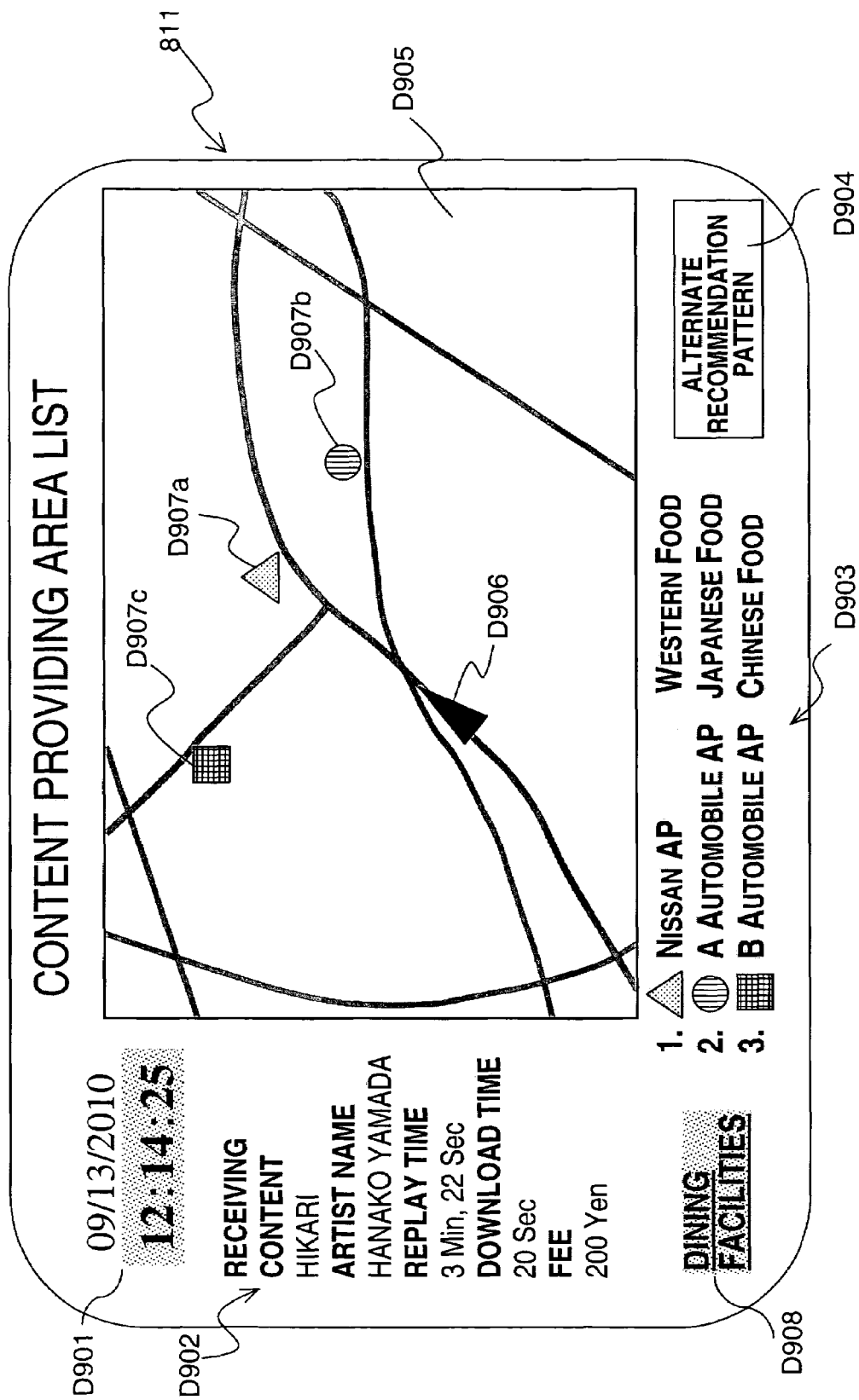
FIG. 9 is a diagrammatic view of a displaying section of a vehicle-mounted terminal device of the content providing area presentation system in accordance with the third embodiment of the present invention.
Figure 10:
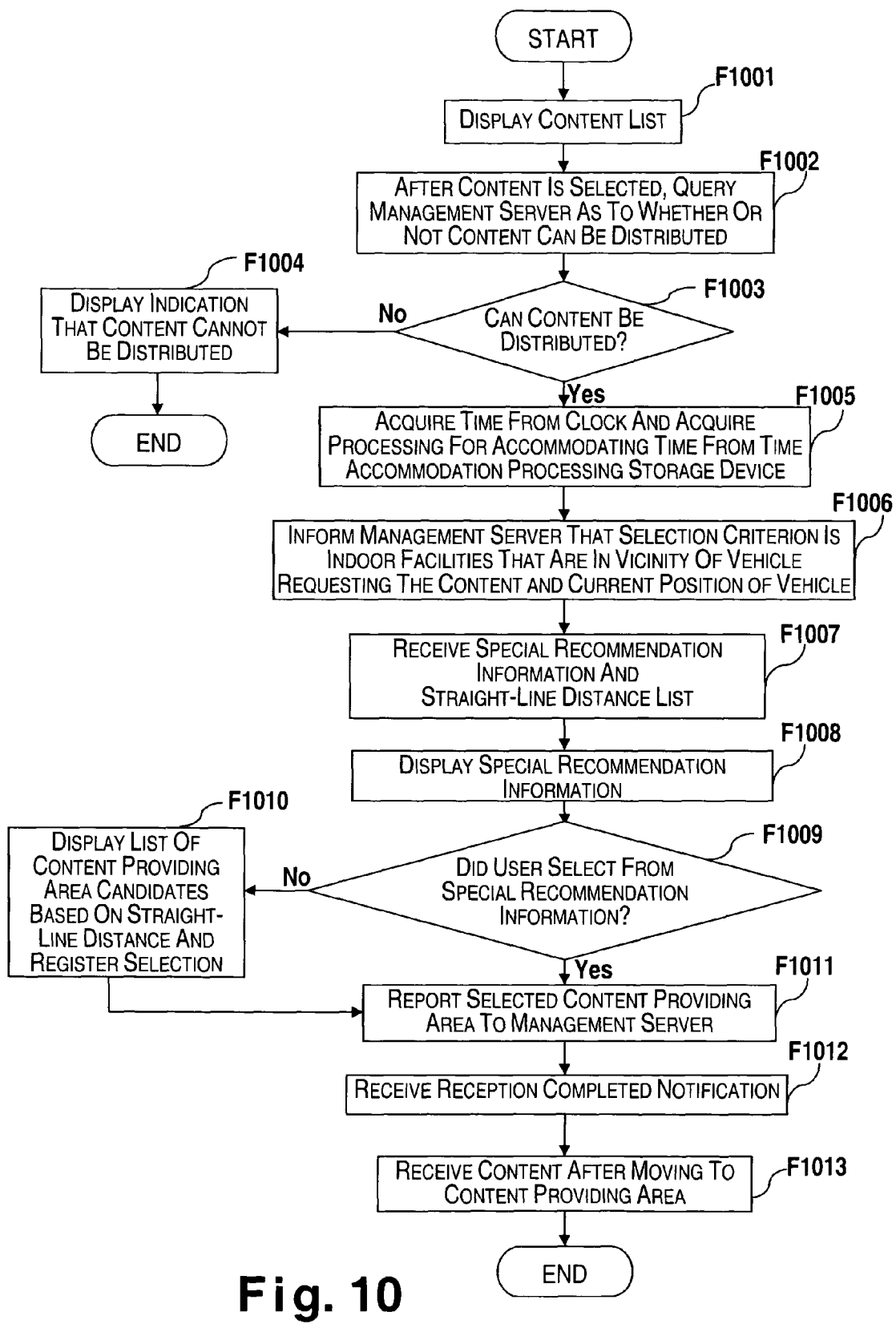
FIG. 10 is a flowchart showing information processing steps executed by the vehicle-mounted terminal device of the content providing area presentation system in accordance with the third embodiment of the present invention.

Referring now to FIGS. 8–10, a content providing area presentation system in accordance with a third embodiment will now be explained. In view of the similarity between the first and third embodiments, the descriptions of the parts of the third embodiment that are identical to the parts of the first and second embodiments may be omitted for the sake of brevity.

FIG. 8 is a system block diagram showing the main features of a content providing area presentation system in accordance with the third embodiment of the present invention. The content providing area presentation system of the third embodiment differs from the first embodiment in that a vehicle-mounted terminal device 100 is replaced with a vehicle mounted terminal device 800. More specifically, the vehicle-mounted terminal device 800 differs from the vehicle-mounted terminal device 100 in that the vehicle-mounted terminal device 800 is further provided with a time accommodation processing storage device 812 and a clock 813 connected thereto. The configuration of the center system 850 of the third embodiment is the same as the configuration of the center system 150 of the first embodiment.

In the content providing area presentation system in accordance with the third embodiment of the present invention, the time accommodation processing storage device 812 of the vehicle-mounted terminal device 800 is configured and arranged to extract a type of content providing area related to an event in accordance with the time detected by the clock 813. More specifically, the time accommodation processing storage device 812 is preferably configured and arranged to store a type of content providing areas established in such as a restaurant and other eating facility when the time detected by the clock 813 indicates it is time for a meal.

In the content providing area presentation system in accordance with the third embodiment, when a content request for content is issued between 11:00 A.M. and 1:00 P.M., for example, the selection criterion is set to list a plurality of content providing area candidates related to an event taking into consideration the current time of the content request.

FIG. 9 is a diagrammatic view of an example of a displaying section 811 of the vehicle-mounted terminal device 800 in accordance with the third embodiment of the present invention. As shown in FIG. 9, the following display items are provided on the content providing area selection screen of the third embodiment: a current time D901, a properties of a requested content D902, special recommendation information D903, a special recommendation information cancel button D904, a map D905 and selection criterion information D908.

In the third embodiment of the present invention, the current time is used as the selection criterion. Therefore, the selection criterion information D908 is configured to indicate the type of content providing area candidates listed in the special recommendation information D903, e.g., "Dining Facilities". Moreover, as seen in FIG. 9, the selection criterion information D908 and the current time D901 are preferably displayed in the same color indicated as ▒ in FIG. 9 to emphasize the relation between the content providing area candidates listed in the special recommendation information D903 and the current time D901. This arrangement allows related information to be recognized at a glance. Moreover, this arrangement is convenient when selecting a location of the content providing area. Of course, it will be apparent to those skilled in the art from this disclosure that other methods can be used to emphasize the relation between the content providing area candidates listed in the special recommendation information D903 and the current time D901.

The content providing area is selected from the content providing area candidates listed in the special recommendation information D903. In the third embodiment of the present invention, the type of eating facility, e.g., Western food, Japanese food, or Chinese food, is preferably displayed along with each of the content providing area candidates listed in the special recommendation information D903. This information can be used as a reference or supplement in selecting a content providing area from the special recommendation information D903.

When the user does not want to stop by any of the displayed content providing areas, the user can press the special recommendation information cancel button D904 to cancel the special recommendation information D903. When the special recommendation information cancel button D904 is selected, a straight-line distance list that lists content providing area candidates in order from the closest location to the furthest location from the current position of the vehicle in terms of straight-line distance is displayed.

The map D905 is preferably a map of the area surrounding the current position of the vehicle. Moreover, as seen in FIG. 9, the map D905 is preferably configured and arranged to include a vehicle icon D906 indicating the current position of the vehicle, and content providing area candidate icons D907a, D907b and D907c indicating a location of each of the content providing area candidates. The vehicle icon D906 and the content providing area icons D907a, D907b and D907c in the map D905 can be used as additional or supplemental information regarding the content providing areas when the user selects the content providing area where the user wishes to receive the content.

Referring now to FIG. 10, the operation of the content providing area presentation system in accordance with the third embodiment of the present invention will be described. Since the processing flow of the center system 850 of the third embodiment is the same as that the processing flow of the center system 150 of the first embodiment shown in FIG. 3, only the processing flow of the vehicle-mounted terminal device 800 is described in FIG. 10.

First, in step F1001 of FIG. 10, the vehicle-mounted terminal device 800 is configured and arranged to display a content list on the displaying section 811. The user selects the desired content from the displayed content list. After the content has been selected, the vehicle-mounted terminal device 800 is configured and arranged to query the management server 853 as to whether or not the selected content can be distributed in step F1002.

If the vehicle-mounted terminal device 800 receives a notification from the management server 853 that the requested content cannot be distributed in step F1003, the vehicle-mounted terminal device 800 is configured and arranged to display an indication that the content cannot be used in step F1004.

In the third embodiment, the selection criterion is set to recommend content providing areas related to an event in accordance with the time. Therefore, when the vehicle-mounted terminal device 800 is notified in step F1003 that the requested content can be distributed, the vehicle-mounted terminal device 800 is configured and arranged to obtain the time from the clock 813 and acquire processing to accommodate the time from the time accommodation processing storage device 812 in step F1005.

Based on the processing set in the time accommodation processing storage device 812, the vehicle-mounted terminal device 800 is configured and arranged to report the processing for accommodating the time to the management server 853 in step F1006. In content providing area presentation system in accordance with the third embodiment of the present invention, the processing for accommodating, for example, the period from 11:00 A.M. to 1:00 P.M is preferably a proceeding stored in the time accommodation processing storage device 812 that functions to guide the user to a facility where one can eat. Moreover, the vehicle-mounted terminal device 800 is also configured and arranged to report the current position of the vehicle to the management server 853 along with the time accommodation processing in step F1006.

The management server 853 is configured and arranged to create the special recommendation information that lists a plurality of content providing area candidates that are established at eating facilities or close to eating facilities. Moreover, the management server 853 is also configured and arranged to create a straight-line distance list that lists the content providing area candidates in order from the closest location to the farthest location relative to the vehicle requesting the content in terms of straight-line distance. The management server 853 is configured to send the special recommendation information and the straight-line distance list to the vehicle-mounted terminal device 800.

In step F1007, the vehicle-mounted terminal device 800 is configured and arranged to receive the special recommendation information and the straight-line distance list of the content providing area candidates. In step F1008, the vehicle-mounted terminal device 800 is configured and arranged to display the special recommendation information in the displaying section D903 as shown in FIG. 9.

If the user does not select from the special recommendation information D903 displayed in the displaying section 811 and, instead, presses the special recommendation information cancel button D904 in step F1009, then the straight-line distance list of content providing area candidates is displayed in step F1010.

When the user selects the content providing area from the special recommendation information in step F1009 or from the straight-line distance list of content providing area candidates in step F1009, the vehicle-mounted terminal device 800 is configured and arranged to notify the management server 853 which content providing area was selected in step F1011.

In step F1012, the vehicle-mounted terminal device 800 is configured and arranged to receive the reception completed notification from the management server 853. The vehicle-mounted terminal device 800 is configured and arranged to end the processing when the vehicle goes to the selected content providing area and receives the content at the content providing area in step F1013.

Accordingly, the content providing area presentation system in accordance with the third embodiment of the present invention enables the user to receive content in conjunction with a meal or other event that takes place in accordance with the time.

Fourth Embodiment

Referring now to FIGS. 11–14, a content providing area presentation system in accordance with a fourth embodiment will now be explained. In view of the similarity between the first and fourth embodiments, the descriptions of the parts of the fourth embodiment that are identical to the parts of the first embodiment may be omitted for the sake of brevity.

Figure 11:
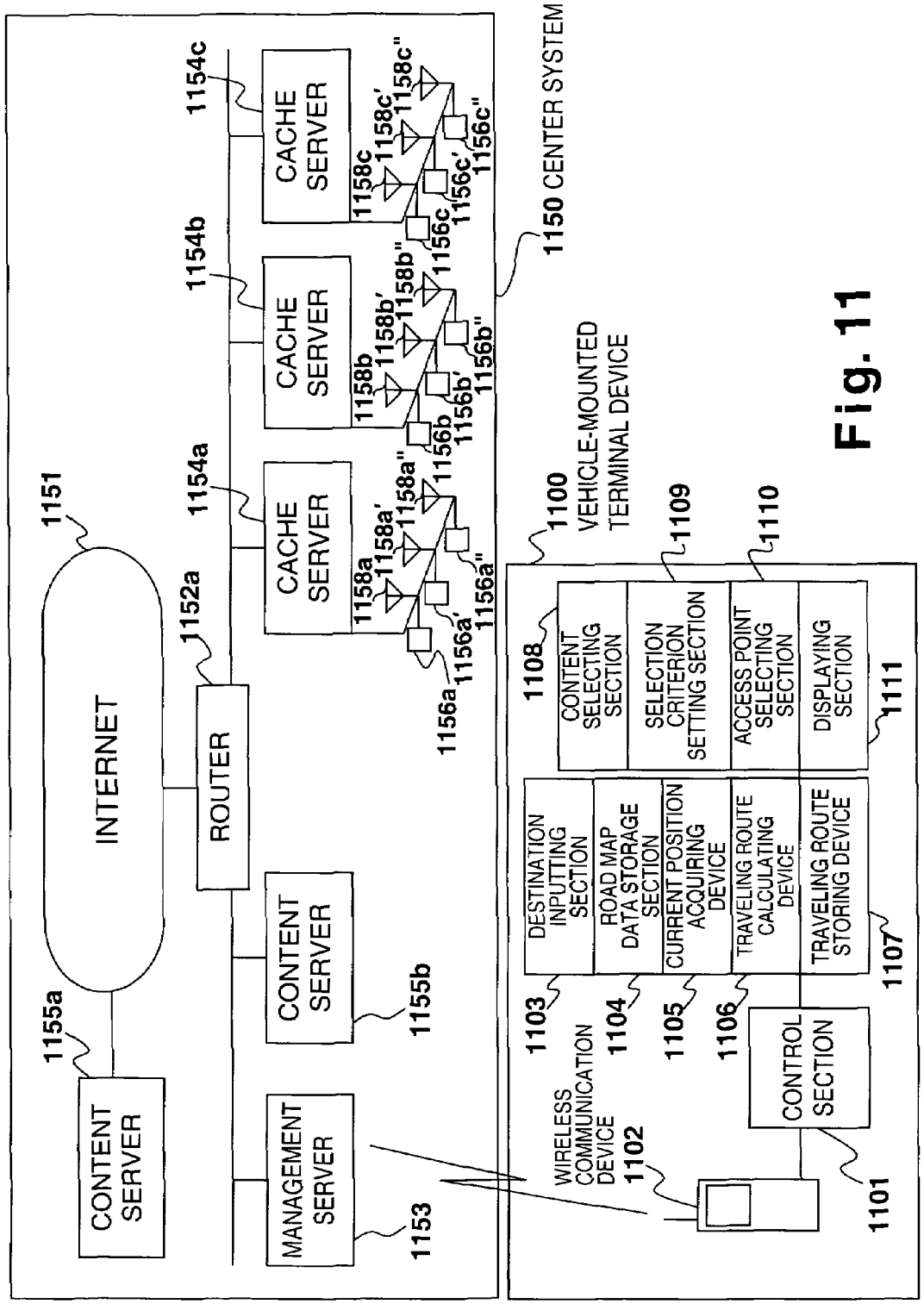
FIG. 11 is a system block diagram showing constituent features of a content providing area presentation system in accordance with a fourth embodiment of the present invention.

FIG. 11 is a system block diagram showing the main features of a content providing area presentation system in accordance with the fourth embodiment of the present invention. The content providing area presentation system in accordance with the fourth embodiment basically comprises a center system 1150 and a vehicle-mounted terminal device 1100. The center system 1150 of the fourth embodiment differs from the center system 150 of the first embodiment in that the center system 1150 further includes content providing area information acquiring devices 1156a, 1156a', 1156a'', 1156b, 1156b', 1156b'', 1156c, 1156c' and 1156c'' that are connected to the wireless access points 1158a, 1158a', 1158a'', 1158b, 1158b', 1158b'', 1158c, 1158c', and 1158c'', respectively. The configuration of the vehicle-mounted terminal device 1100 of the fourth embodiment is basically the same as the configuration of the vehicle-mounted terminal device 100 of the first embodiment.

Each of the content providing area information acquiring devices 1156a, 1156a', 1156a'', 1156b, 1156b', 1156b'', 1156c, 1156c' and 1156c'' is configured and arranged to acquire information regarding the state of the area surrounding the corresponding wireless access points 1158a, 1158a', 1158a'', 1158b, 1158b', 1158b'', 1158c, 1158c', and 1158c'', respectively. More specifically, in the fourth embodiment of the present invention, each of the content providing area information acquiring devices 1156a, 1156a', 1156a'', 1156b, 1156b', 1156b'', 1156c, 1156c' and 1156c'' is preferably configured and arranged to acquire information regarding parking space vacancies in the area surrounding the corresponding wireless access points 1158a, 1158a', 1158a'', 1158b, 1158b', 1158b'', 1158c, 1158c', and 1158c'', respectively. The content providing area information acquiring devices 1156a, 1156a', 1156a'', 1156b, 1156b', 1156b'', 1156c, 1156c' and 1156c'' are further configured and arranged to send the acquired information to a management server 1153.

Here, for example, when a content request for content is issued from the vehicle-mounted terminal device 1100 of the content providing area presentation system in accordance with the fourth embodiment, the selection criterion is set to "list content providing areas where there is a vacant parking space available".

Figure 12:
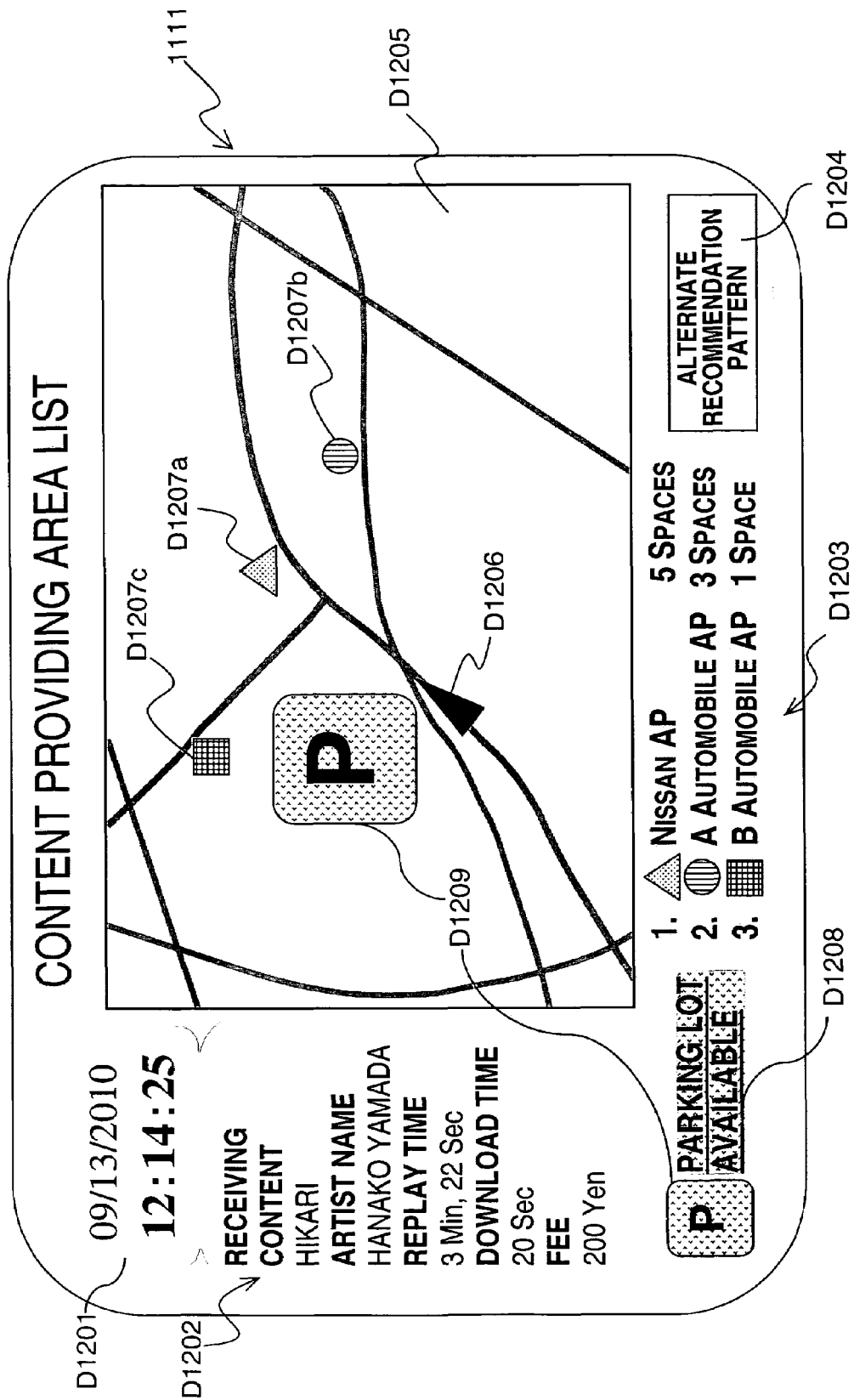
FIG. 12 is a diagrammatic view of a displaying section of a vehicle-mounted terminal device of the content providing area presentation system in accordance with the fourth embodiment of the present invention.

FIG. 12 is a diagrammatic view of an example of a displaying section 1111 of the vehicle-mounted terminal device 1100 in accordance with the fourth embodiment of the present invention. As shown in FIG. 12, the following display items are basically provided on the content providing area selection screen of the fourth embodiment: a current time D1201, properties of a requested content D1202, special recommendation information D1203, a special recommendation information cancel button D1204, a map D1205, selection criterion information D1208 and a pair of parking icons D1209.

In the fourth embodiment of the present invention, the existence of a vacant parking space at the content providing area is preferably used as the selection criterion. Therefore, the selection criterion information D1208 is configured to indicate the type of content providing area candidates listed in the special recommendation information D1203, e.g., "Parking Lot Available". Moreover, as seen in FIG. 12, the parking space icons D1209 are displayed on the map D1205 and the selection criterion information D1208 to emphasize the relation between the content providing area candidates listed in the special recommendation information D1208 and the existence of a parking space. This arrangement allows related information to be recognized at a glance. Moreover, this arrangement is convenient when selecting a location of the content providing area. Of course, it will be apparent to those skilled in the art from this disclosure that other methods can be used to emphasize the relation between the content providing area candidates listed in the special recommendation information D1208 and the existence of a parking space.

The content providing area is selected from the content providing area candidates listed in the special recommendation information D1203. In the fourth embodiment of the present invention, the content providing area candidates having a vacant parking space are preferably displayed along with the number of vacant parking spaces in each of the content providing area candidates, as seen in FIG. 12. This information can be used as a reference or supplement in selecting a content providing area from the special recommendation information D1203.

When the user does not want to stop by any of the displayed content providing areas, the user can press the special recommendation information cancel button D1204 to cancel the special recommendation information D1203. When the special recommendation information cancel button D1204 is selected, a straight-line distance list that lists content providing area candidates in order from the closest location to the farthest location relative to the current position of the vehicle in terms of straight-line distance is displayed.

The map D1205 is preferably a map of the area surrounding the current position of the vehicle. Moreover, as seen in FIG. 12, the map D1205 is preferably configured and arranged to include a vehicle icon D1206 indicating the current position of the vehicle, and a plurality of content providing area candidate icons D1207a, D1207b and D1207c indicating a location of each of the content providing area candidates. The vehicle icon D1206 and the content providing area candidate icons D1207a, D1207b and D1207c in the map D1205 can be used as additional or supplemental information regarding the content providing areas when the user selects the content providing area where the user wishes to receive the content.

Figure 13:
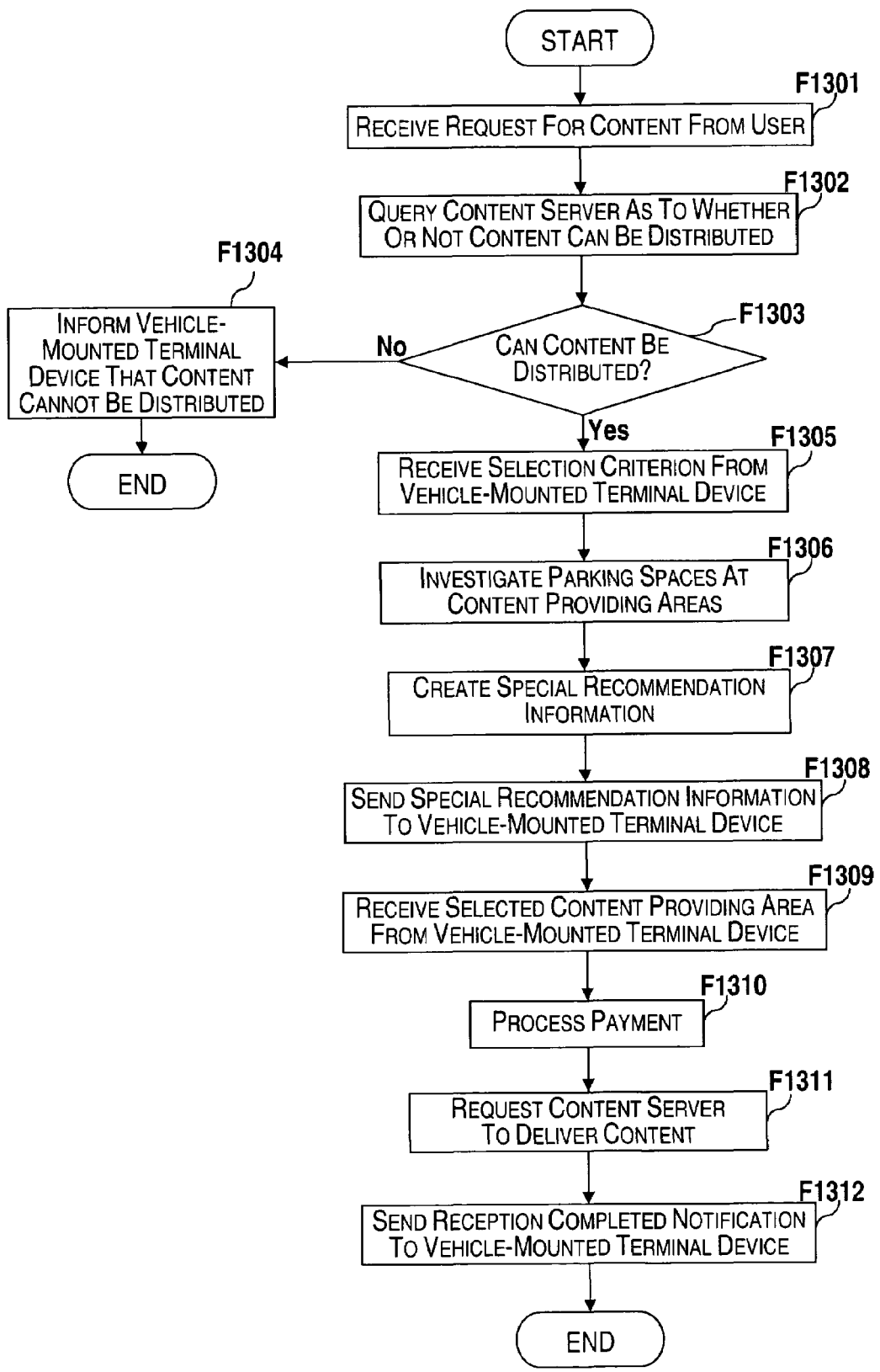
FIG. 13 is a flowchart showing information processing steps executed by a center system of the content providing area presentation system in accordance with the fourth embodiment of the present invention.

The processing flow of the center system 1150 will now be described referring to FIG. 13. FIG. 13 is a flowchart showing the information processing steps executed by the center system 1150 in accordance with the fourth embodiment of the present invention.

First, in step F1301, the management server 1153 of the center system 1150 is configured and arranged to receive a content request for content from the vehicle-mounted terminal device 1100 of the user. Then, the management server 1153 is further configured and arranged to query the content server 1155a or 1155b regarding whether or not the requested content can be distributed in step F1302. If it is not possible to distribute the content in step F1303, the management server 1153 is configured and arranged to inform the vehicle-mounted terminal device 1100 that the content cannot be distributed in step F1304.

If the management server 1153 determines in step F1303 that the content can be distributed, the management server 1153 is configured and arranged to receive the selection criterion from the vehicle-mounted terminal device 1100 in step F1305. In the fourth embodiment of the present invention, the selection criterion is set to "list content providing areas having a vacant parking space available". Therefore, the content providing area information acquiring devices 1156a, 1156a', 1156a'', 1156b, 1156b', 1156b'', 1156c, 1156c' and 1156c'' installed at the wireless access points 1158a, 1158a', 1158a'', 1158b, 1158b', 1158b'', 1158c, 1158c', and 1158c'', respectively, are used to investigate the parking spaces at the content providing areas corresponding to the wireless access points 1158a, 1158a', 1158a'', 1158b, 1158b', 1158b'', 1158c, 1158c', and 1158c'' in step F1306. Based on the investigation results in step F1306, the management server 1153 is configured and arranged to create special recommendation information that lists content providing area candidates having a vacant parking space available in step F1307. The management server 1153 is also configured and arranged to create a straight-line distance list that lists content providing area candidates in order from the shortest straight-line distance to the farthest straight-line distance from the current position of the vehicle in step F1307.

Next, the management server 1153 is configured and arranged to report the special recommendation information created in step F1307 to the vehicle-mounted terminal device 1100 in step F1308. Then, the management server 1153 is configured and arranged to receive a result of the selection of the content providing area by the user from the vehicle-mounted terminal device 1100 in step F1309. In step F1310, a payment processing is executed. In step F1311, the management server is configured and arranged to request the content server 1155a or 1155b to distribute the content. Then, in step F1312, the management server 1153 is configured and arranged to send a notification to the vehicle-mounted terminal 1100 informing that reception of the content request by the user has been completed.

Figure 14:
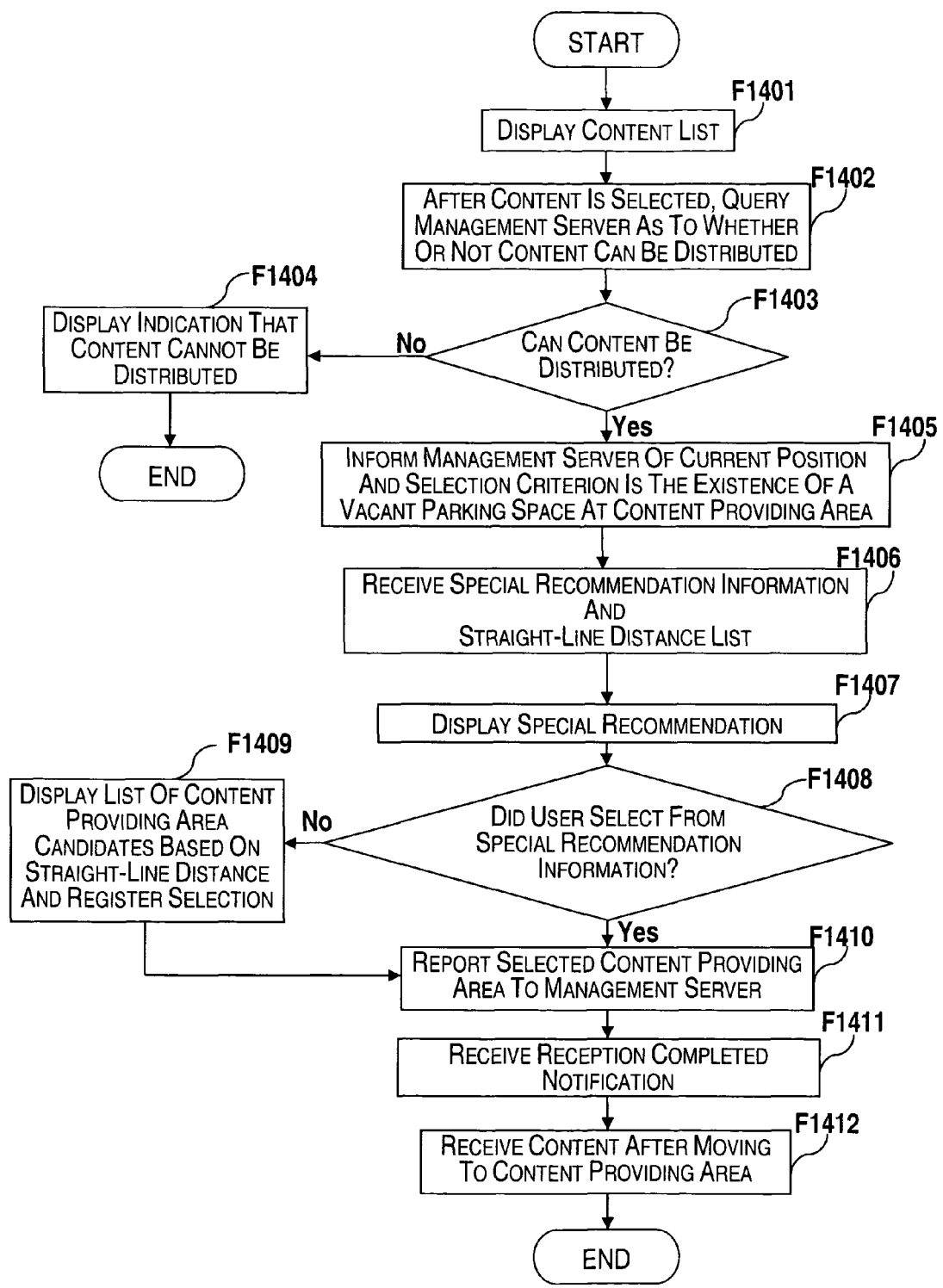
FIG. 14 is a flowchart showing information processing steps executed by the vehicle-mounted terminal device of the content providing area presentation system in accordance with the fourth embodiment of the present invention.

Next, the processing flow of the vehicle terminal device 1100 is explained referring to FIG. 14. FIG. 14 is a flowchart showing the information processing steps executed by the vehicle-mounted terminal device 1100 in accordance with the fourth embodiment of the present invention.

First, in step F1401 of FIG. 14, the vehicle-mounted terminal device 1100 is configured and arranged to display a content list on the displaying section 1111. The user selects the desired content from the displayed content list. After the content has been selected, the vehicle-mounted terminal device 1100 is configured and arranged to query the management server 1153 as to whether or not the selected content can be distributed in step F1402.

If the vehicle-mounted terminal device 1100 receives a notification from the management server 1153 that the requested content cannot be distributed in step F1403, the vehicle-mounted terminal device 1100 is configured and arranged to display an indication that the content cannot be distributed in step F1404.

If the vehicle-mounted terminal device 1100 is notified in step F1403 that the requested content can be distributed, the vehicle-mounted terminal device 1100 is configured and arranged to inform the management server 1153 that the selection criterion is "list content providing areas having a vacant parking space available" in step F1405. Simultaneously, in step F1405, the vehicle-mounted terminal device 1100 is configured and arranged to report the current position of the vehicle to the management server 1153 that is obtained from a current position acquiring device 1105 of the vehicle-mounted terminal device 1100.

Using the content providing area information acquiring devices 1156a, 1156a', 1156a'', 1156b, 1156b', 1156b'', 1156c, 1156c' and 1156c'' connected to the wireless access points 1158a, 1158a', 1158a'', 1158b, 1158b', 1158b'', 1158c, 1158c', and 1158c'' corresponding to the content providing areas, the management server 1153 is configured to investigate which of the content providing areas have vacant parking spaces (step F1306 in FIG. 13). Based on the results of the investigation, the management server 1153 is configured and arranged to create the special recommendation information that lists the content providing area candidates having a vacant parking space and a straight-line distance list of content providing area candidates (step F1307 in FIG. 13). The management server 1153 is configured and arranged to send the special recommendation information and the straight-line distance list of the content providing area candidates to the vehicle terminal device 1100 (step F1308 in FIG. 13).

The vehicle-mounted terminal device 1100 is configured and arranged to receive the special recommendation information and the straight-line distance list of content providing area candidates in step F1406. Then the vehicle-mounted terminal device 1100 is configured and arranged to display the special recommendation information D1203 in the displaying section 1111 in step F1407.

If the user presses the special recommendation information cancel button D1204 in step F1408 without selecting from the special recommendation information D1203 displayed on the displaying section 1111, in step F1409, the vehicle-mounted terminal device 1100 is configured and arranged to display the straight-line distance list of content providing area candidates received in step F1406 on the displaying section 1111.

When the user selects the content providing area from the special recommendation information in step F1408 or from the straight-line distance list of content providing area candidates in step F1409, the vehicle-mounted terminal device 1100 is configured and arranged to notify the management server 1153 which content providing area was selected in step F1410.

In step F1411, the vehicle-mounted terminal device 1100 is configured and arranged to receive the reception completed notification from the management server 1153. The vehicle-mounted terminal device 1100 is configured and arranged to end the processing when the vehicle goes to the selected content providing area and receives the content at the content providing area in step F1412.

Accordingly, the content providing area presentation system in accordance with the fourth embodiment of the present invention enables the user to check information regarding vacant parking spaces and select a content providing area having a vacant parking space. Therefore, the user does not have to struggle for finding a parking space after arriving at the selected content providing are. As a result, the content can be received in the minimum amount of communication time after arriving at the content providing area.

In the fourth embodiment of the present invention, vacant parking space information is used as the information related to the content receiving area. It will be apparent to those skilled in the art from this disclosure that other content providing area information can be used as the information related to the content receiving area. For example, it is also possible to use the amount of excess processing capacity of the wireless access points 1158a, 1158a', 1158a", 1158b, 1158b', 1158b", 1158c, 1158c', and 1158c" corresponding to the content providing areas as the content providing area information.

More specifically, the content providing area presentation system in accordance with the fourth embodiment of the present invention can be configured such that the vehicle-mounted terminal device 1100 is configured and arranged to inform the management server 1153 that the selection criterion is based on the wireless access point corresponding to the content providing area to have excess or enough processing capacity for the selected content.

In such a case, when the management server 1153 creates the special recommendation information, the management server 1153 is configured and arranged to use the content providing area information acquiring devices 1156a, 1156a', 1156a", 1156b, 1156b', 1156b", 156c, 1156c' and 1156c" to acquire the quantity of tasks awaiting communication processing at the corresponding wireless access points 1158a, 1158a', 1158a", 1158b, 1158b', 1158b", 1158c, 1158c', and 1158c" installed at the corresponding content providing areas. Thus, when the management server 1153 creates the special recommendation information, the management server 1153 is configured and arranged to create and send a list of content providing area candidates where the wireless access points have excess processing capacity to the vehicle-mounted terminal device 1100. This arrangement shortens the receiving time the user takes to receive the content at the content providing area.

The vacant parking space information and content providing area processing capacity are included, but not limited to in the "content providing area information" mentioned in the claims.

Fifth Embodiment

Referring now to FIGS. 15–18, a content providing area presentation system in accordance with a fifth embodiment will now be explained. In view of the similarity between the first and fifth embodiments, the descriptions of the parts of the fifth embodiment that are identical to the parts of the first embodiment may be omitted for the sake of brevity.

Figure 15:
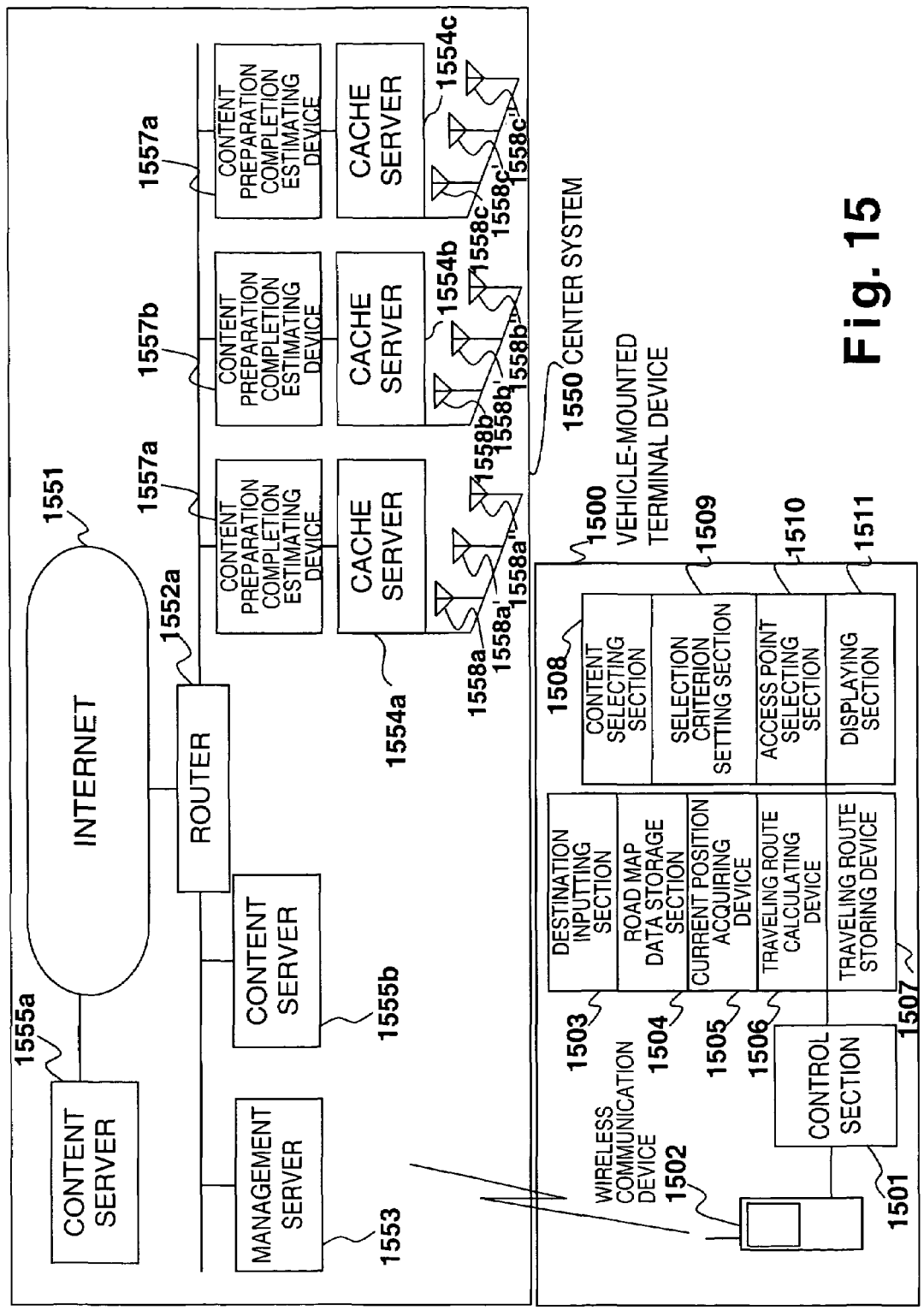
FIG. 15 is a system block diagram showing constituent features of a content providing area presentation system in accordance with a fifth embodiment of the present invention.

FIG. 15 is a system block diagram showing the main features of a presentation system utilizing a content providing area presentation method in accordance with a fifth embodiment of the present invention. The content providing area presentation system of the fifth embodiment differs from the first embodiment in that a center system 1550 is substituted for the center system 150. More specifically, the center system 1550 differs from the center system 150 in that the center system 1550 further includes content preparation completion estimating devices 1557a, 1557b and 1557c connected to cache servers 1554a, 1554b and 1554c of the center system 1550, respectively. The configuration of the vehicle-mounted terminal device 1500 is the same as the vehicle-mounted terminal device 100 of the first embodiment.

The content preparation completion estimating devices 1557a, 1557b and 1557c of this embodiment are configured and arranged to detect the amount of time required for the content to be delivered from the content server 1555a or 1555b to the cache servers 1554a, 1554b and 1554c and made available at the content providing areas corresponding to wireless access points 1558a, 1558a', 1558a", 1558b, 1558b', 1558b", 1558c, 1558c', and 1558c".

In the fifth embodiment of the present invention, a case in which a content request for content is issued from the vehicle when the selection criterion is set to "list content providing area candidates where content preparation will be complete when the user arrives at the content providing area".

Figure 16:
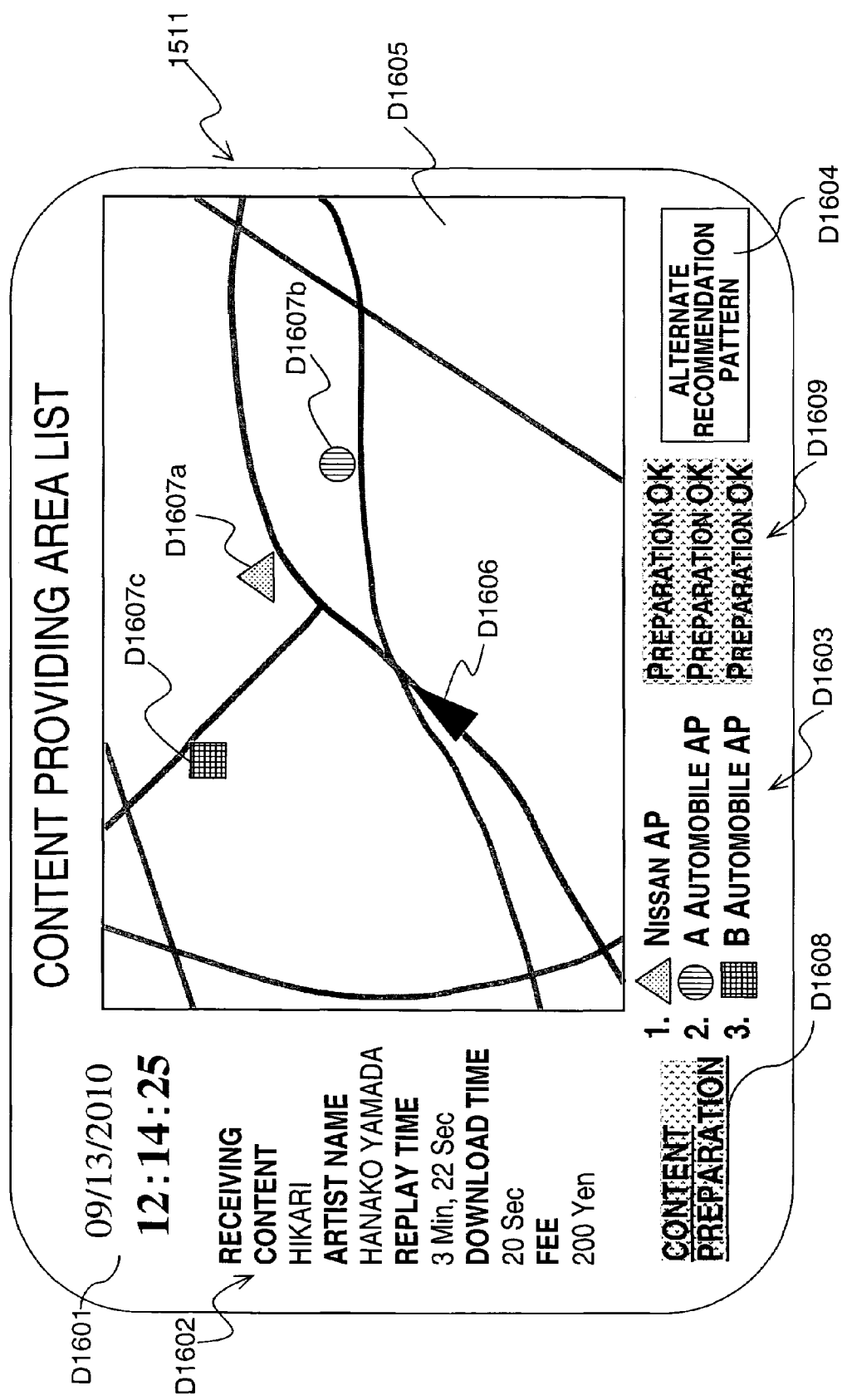
FIG. 16 is a diagrammatic view of a displaying section of a vehicle-mounted terminal device of the content providing area presentation system in accordance with the fifth embodiment of the present invention.

FIG. 16 is a diagrammatic view of an example of a displaying section 1511 of the vehicle-mounted terminal device 1500 in accordance with the fifth embodiment of the present invention. As shown in FIG. 16, the following display items are preferably provided on the content providing area selection screen of the fifth embodiment: a current time D1601, properties of a requested content D1602, special recommendation information D1603, a special recommendation information cancel button D1604, a map D1605, selection criterion information D1608, and a plurality of preparation indication icons D1609.

In the fifth embodiment of the present invention, completion of the content preparation before arrival at the content providing area is used as the selection criterion. Therefore, the selection criterion information D1608 is configured to indicate the type of content providing area candidates listed in the special recommendation information D1603, e.g., "Content Preparation". Moreover, as seen in FIG. 16, the preparation indication icons D1609 are arranged to indicate whether or not it is possible to receive the content. Furthermore, the selection criterion information D1608 and the preparation indication icons D1609 are arranged so as to emphasize the relation between the content providing areas listed in the special recommendation information D1603 and possibility of receiving the content (completion of content preparation). This arrangement allows related information to be recognized at a glance. Moreover, this arrangement is convenient when selecting a location of the content providing area.

The content providing area is selected from the content providing area candidates listed in the special recommendation information D1604. In the fifth embodiment of the present invention, the content providing area candidates are displayed along with the indication icons D1609 indicative of whether or not the content can be received. This information can be used as a reference or supplement in selecting a content providing area.

When the user does not want to stop by any of the displayed content providing areas, the user can press the special recommendation information cancel button D1604 to cancel the special recommendation information D1603. When the special recommendation information cancel button D1604 is selected, a straight-line distance list that lists content providing area candidates in order from the closest location to the farthest location relative to the current position of the vehicle in terms of straight-line distance is displayed.

The map D1605 is preferably a map of the area surrounding the current position of the vehicle. Moreover, as seen in FIG. 16, the map D1605 is preferably configured and arranged to include a vehicle icon D1606 indicating the current position of the vehicle, and a plurality of content providing area candidate icons D1607a, D1607b and D1607c indicating a location of each of the content providing area candidates listed in the special recommendation information D1603. The vehicle icon D1606 and the content providing area icons D1607a, D1607b and D1607c in the map D1605 can be used as additional or supplemental information regarding the content providing areas when the user selects the content providing area where the user wishes to receive the content.

Figure 17:
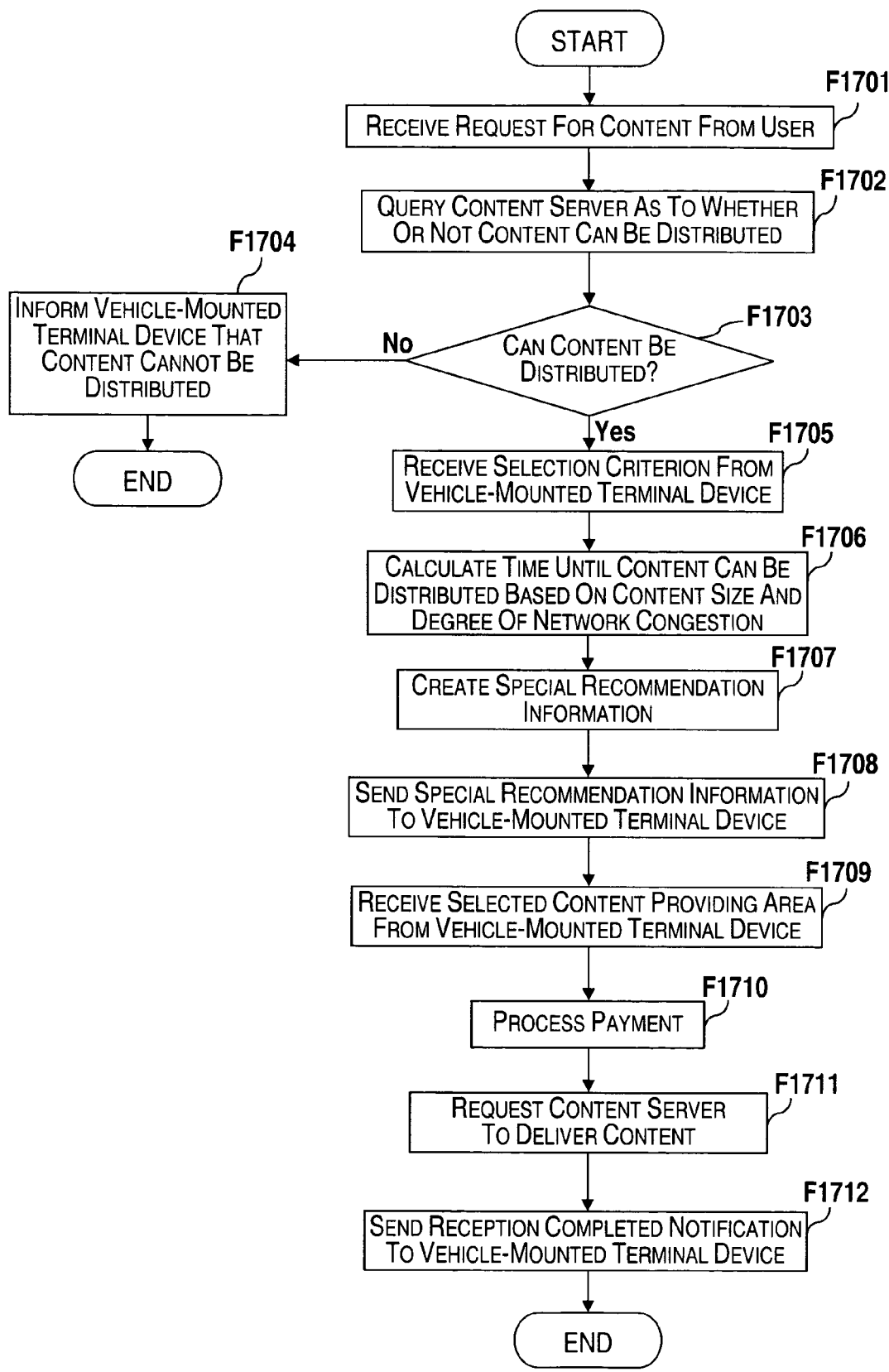
FIG. 17 is a flowchart showing information processing steps executed by a center system of the content providing area presentation system in accordance with the fifth embodiment of the present invention.

The processing flow of the center system 1550 will now be described referring to FIG. 17. FIG. 17 is a flowchart showing the information processing steps executed by the center system 1550 in accordance with the fifth embodiment of the present invention.

First, in step F1701, the management server 1553 of the center system 1550 is configured and arranged to receive a content request for the content from the vehicle-mounted terminal device 1500 of the user. Then, the management server 1553 is further configured and arranged to query the content server 1555a or 1555b regarding whether or not the requested content can be distributed in step F1702. If it is not possible to distribute the content in step F1703, the management server 1553 is configured and arranged to inform the vehicle-mounted terminal device 1500 that the content cannot be distributed in step F1704.

If the management server 1553 determines in step F1703 that the requested content is possible to be distributed, the management server 1553 is configured and arranged to receive the selection criterion for the content providing areas from the vehicle-mounted terminal device 1500 in step F1705.

In the fifth embodiment of the present invention, the selection criterion is set to the content preparation will be complete by the time the user arrives at the content providing area. Therefore, after receiving the selection criterion in step F1705, the content preparation completion estimating devices 1557a, 1557b and 1557c connected to the cache servers 1554a, 1554b and 1554c, respectively, corresponding to the access points 1558a-1558a", 1558b-1558b" and 1558c-1558c" are used to investigate the time required to make the content available at the content providing areas in step F1706. Based on the investigation results in step F1706, the management server 1553 is configured and arranged to create the special recommendation information that lists the content providing area candidates where the content preparation will be complete by the time the user arrives at the content providing area in step F1707. At the same time, in step F1707, the management server 1553 is also configured and arranged to create a straight-line distance list that lists content providing area candidates in order from the shortest straight-line distance to the farthest straight-line distance from the current position of the vehicle.

Next, the management server 1553 is configured and arranged to report the special recommendation information created in step F1707 to the vehicle-mounted terminal device 1500 in step F1708. Then, the management server 1553 is configured and arranged to receive a result of the selection of the content providing area by the user from the vehicle-mounted terminal device 1500 in step F1709. In step F1710, a payment processing is executed. In step F1711, the management server is configured and arranged to request the content server 1555a or 1555b to distribute the content. Then, in step F1712, the management server 1553 is configured and arranged to send a notification to the vehicle-mounted terminal 1500 informing that reception of the request by the user has been completed.

Figure 18:
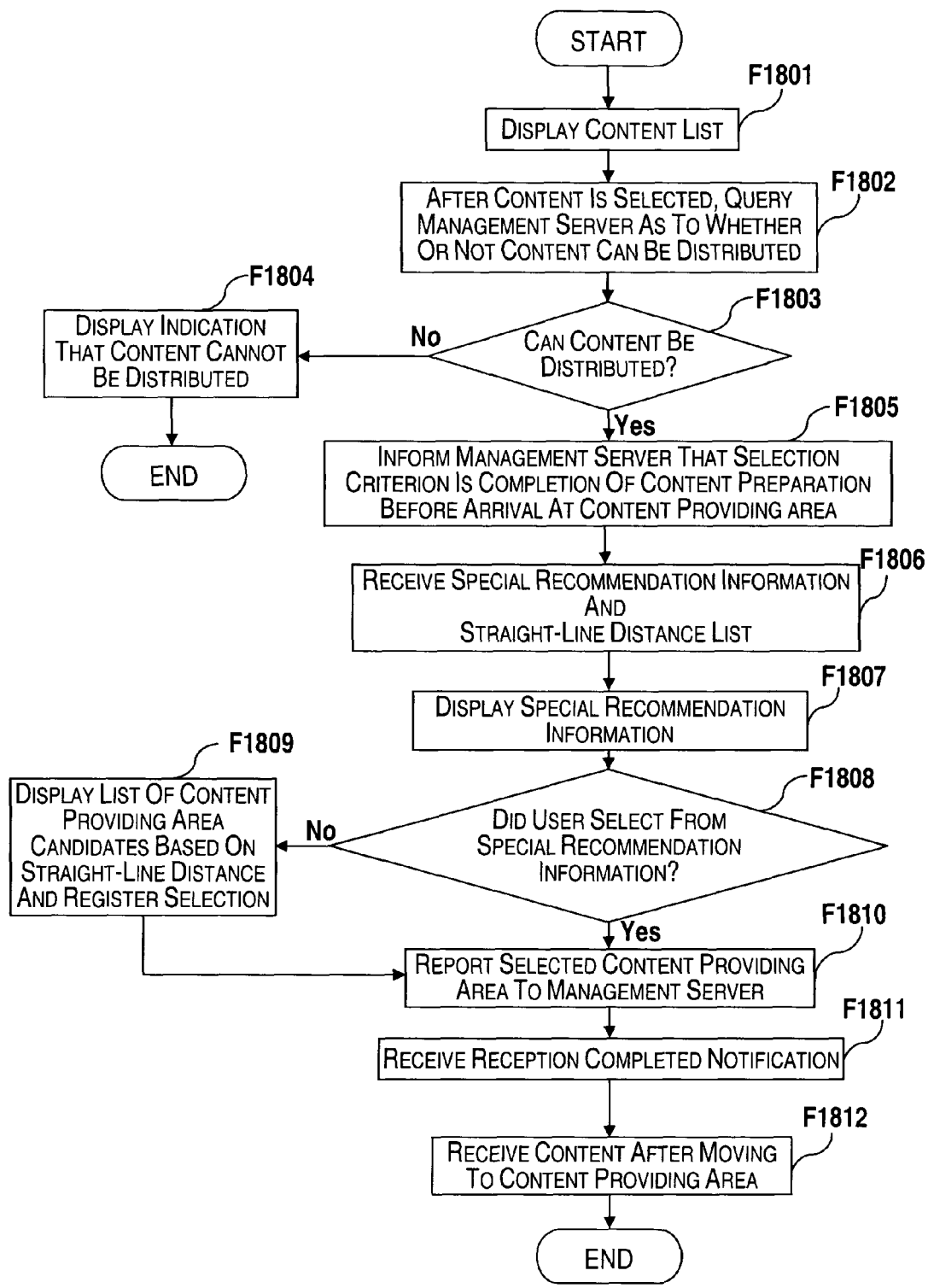
FIG. 18 is a flowchart showing information processing steps executed by the vehicle-mounted terminal device of the content providing area presentation system in accordance with the fifth embodiment of the present invention.

Next, the processing flow of the vehicle-mounted terminal device 1500 will be explained referring to FIG. 18. FIG. 18 is a flowchart showing the information processing steps executed by the vehicle-mounted terminal device 1500 in accordance with the fifth embodiment of the present invention.

First, in step F1801 of FIG. 18, the vehicle-mounted terminal device 1500 is configured and arranged to display a content list on the displaying section 1511. The user selects the desired content from the displayed content list. After the content has been selected, the vehicle-mounted terminal device 1500 is configured and arranged to query the management server 1553 as to whether or not the selected content can be distributed in step F1802.

If the vehicle-mounted terminal device 1500 receives a notification from the management server 1553 that the requested content cannot be distributed in step F1803, the vehicle-mounted terminal device 1500 is configured and arranged to display an indication that the content cannot be distributed in step F1804.

If the vehicle-mounted terminal device 1500 is notified in step F1803 that the requested content can be distributed, the vehicle-mounted terminal device 1500 is configured and arranged to inform the management server 1553 that the selection criterion is the completion of the content preparation before arrival at the content providing area in step F1805.

After receiving the selection criterion from the vehicle-mounted terminal device 1500, the management server 1553 is configured and arranged to investigate the time required for content preparation at the content providing areas with the wireless access points 1558a–1558a", 1558b–1558b", and 1558c–1558c" by using the content preparation completion estimating devices 1557a, 1557b and 1557c installed at the cache servers 1554a, 1554b and 1554c, respectively (step F1706 in FIG. 17). Based on the results of the investigation, the management server 1553 is configured and arranged to create the special recommendation information that lists the content providing area candidates where preparation will be completed before the user arrives and the straight-line distance list of content providing area candidates (step F1707 in FIG. 17). Then the management server 1553 is configured and arranged to send the special recommendation information and the straight-line distance list of the content providing area candidates to the vehicle-mounted terminal device 1500 (step F1708 in FIG. 17).

The vehicle-mounted terminal device 1500 is configured and arranged to receive the special recommendation information and the straight-line distance list of content providing area candidates in step F1806. Then the vehicle-mounted terminal device 1500 is configured and arranged to display the special recommendation information D1603 in the displaying section 1511 in step F1807.

If the user presses the special recommendation information cancel button D1604 in step F1808 without selecting from the special recommendation information D1603 displayed on the displaying section 1511, in step F1809, the vehicle-mounted terminal device 1500 is configured and arranged to display the straight-lien distance list of content providing area candidates received in step F1806 on the displaying section 1511.

When the user selects the content providing area from the special recommendation information in step F1808 or from the straight-line distance list of the content providing area candidates in step F1809, the vehicle-mounted terminal device 1500 is configured and arranged to notify the management server 1553 which content providing area was selected in step F1810.

In step F1811, the vehicle-mounted terminal device 1500 is configured and arranged to receive the reception completed notification from the management server 1553. The vehicle-mounted terminal device 1500 is configured and arranged to end the processing when the vehicle goes to the selected content providing area and receives the content at the content providing area in step F1812.

Accordingly, the content providing area presentation system in accordance with the fifth embodiment of the present invention makes it possible to select a content providing area where the requested content will be prepared reliably by the time the user arrives at the content providing area, regardless of the size of the content.

Sixth Embodiment

Referring now to FIGS. 19–22, a content providing area presentation system in accordance with a sixth embodiment will now be explained. In view of the similarity between the first and sixth embodiments, the descriptions of the parts of the sixth embodiment that are identical to the parts of the first embodiments may be omitted for the sake of brevity.

Figure 19:
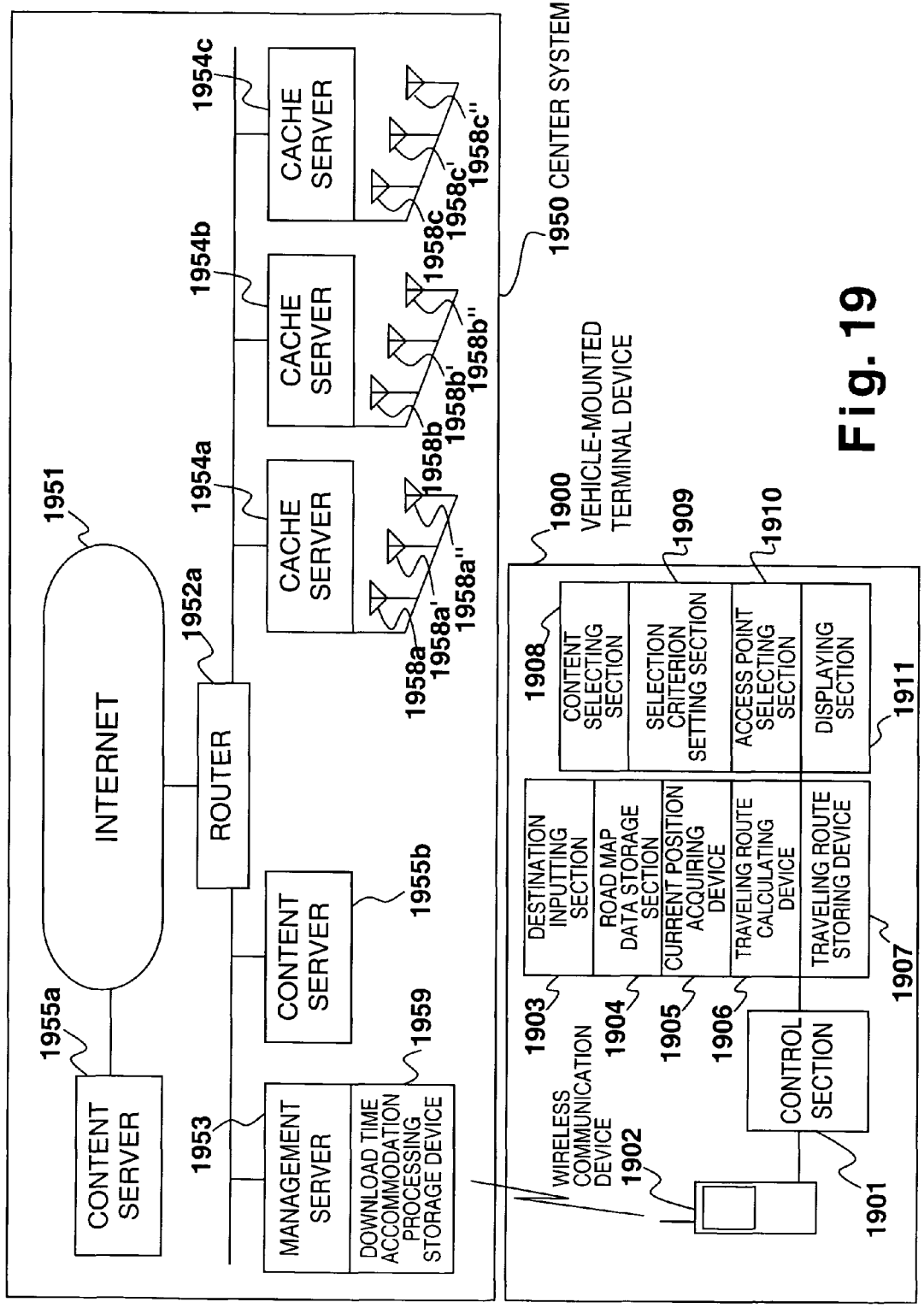
FIG. 19 is a system block diagram showing constituent features of a content providing area presentation system in accordance with a sixth embodiment of the present invention.

FIG. 19 is a system block diagram showing the main features of the content providing area presentation system in accordance with the sixth embodiment of the present invention. The content providing area presentation system of the sixth embodiment differs from the first embodiment in that the center system 1950 is substituted for the center system 150. More specifically, the center system 1950 of the sixth embodiment differs from the center system 150 of the first embodiment in that the center system 1950 further includes a download time accommodation processing storage device 1959 connected to a management server 1953 of the center system 1950. The configuration of a vehicle-mounted terminal device 1900 of the sixth embodiment is the same as the vehicle-mounted terminal device 100 of the first embodiment.

The download time accommodation processing storage device 1959 is configured and arranged to store types of content providing areas where there is an event that accommodates the download time of the content. For example, the download time accommodation processing storage device 1959 is configured and arranged to store types of content providing areas where the user can fill in the time during the download of the content when the expected download time for the content is long. More specifically, the download time accommodation processing storage device 1959 is preferably configured and arranged to store the types of the content providing areas that are close to, for example, a coffee shop, movie theater, or restaurant, when the expected download time for the content is long.

In the sixth embodiment of the present invention, when a content request for content is issued from the vehicle, when the selection criterion is set to "list content providing areas in accordance with the download time".

Figure 20:
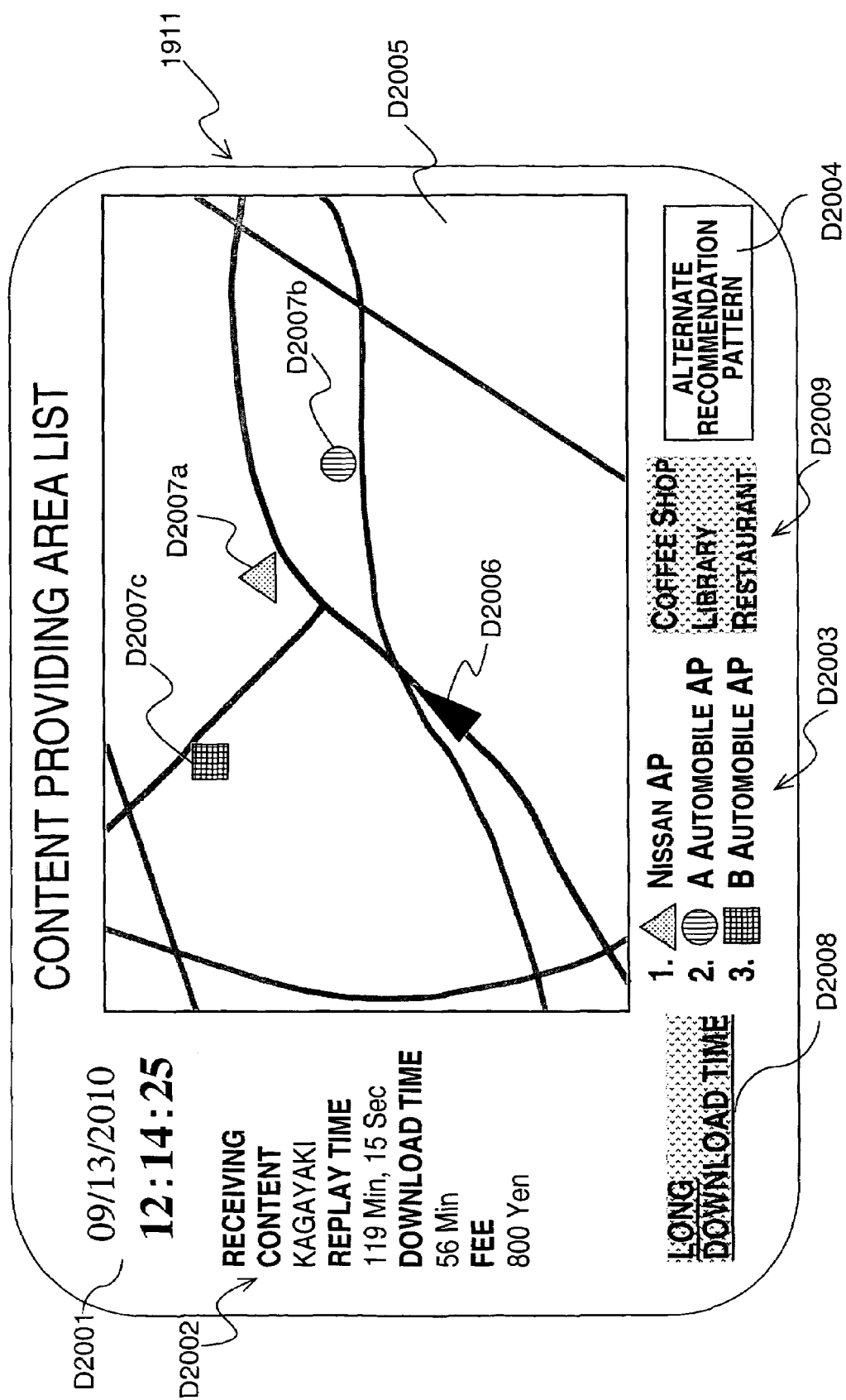
FIG. 20 is a diagrammatic view of a displaying section of a vehicle-mounted terminal device of the content providing area presentation system in accordance with the sixth embodiment of the present invention.

FIG. 20 is a diagrammatic view of an example of a displaying section 1911 of the vehicle-mounted terminal device 1900 in accordance with the sixth embodiment of the present invention. As shown in FIG. 20, the following display items are preferably provided on the content providing area selection screen of the sixth embodiment: a current time D2001, properties of a requested content D2002, special recommendation information D2003, a special recommendation information cancel button D2004, a map D2005, selection criterion information D2008, and a plurality of location indication icons D2009.

In the content providing area presentation system in accordance with the sixth embodiment of the present invention, suitability of the content providing area in view of the download time for the content is used as the selection criterion. Therefore, the selection criterion information D2008 is configured to indicate the type of content providing area candidates listed in the special recommendation information D2003, e.g., "Long Download Time". Moreover, as seen in FIG. 20, the location indication icons D2009 are arranged to indicate the type of the content providing areas, e.g., coffee shop, library or restaurant. Furthermore, the selection criterion information D2008 and the location indication icons D2009 are arranged so as to emphasize the relation between the content receiving are candidates listed in the special recommendation information D2003 and the content providing area information. This arrangement allows related information to be recognized at a glance. Moreover, this arrangement is convenient when selecting a location of the content providing area.

The content providing area is selected from the content providing area candidates displayed in special recommendation information D2003. In the sixth embodiment of the present invention, the content providing area candidates are displayed in accordance with the required download time for the content. More specifically, the content providing area candidates are displayed along with the indication icons indicative of the type of content providing area in which the user can fill in the time during the download of the content. This information can be used as a reference or supplement in selecting a content providing area from the special recommendation information D2003.

When the user does not want to stop by any of the displayed content providing areas, the user can press the special recommendation information cancel button D2004 to cancel the special recommendation information D2003. When the special recommendation information cancel button D2004 is selected, a straight-line distance list that lists content providing area candidates in order from the closest location to farthest location relative to the current position of the vehicle in terms of straight-line distance is displayed.

The map D2005 is preferably a map of the area surrounding the current position of the vehicle. Moreover, as seen in FIG. 20, the map D2005 is preferably configured and arranged to include a vehicle icon D2006 indicating the current position of the vehicle, and a plurality of content providing area candidate icons D2007a, D2007b and D2007c indicating a location of each of the content providing area candidates listed in the special recommendation information D2003. The vehicle icon D2006 and the content providing area icons D2007a, D2007b and D2007c in the map D2005 can be used as additional or supplemental information regarding the content providing areas when the user selects the content providing area where the user wishes to receive the content.

Figure 21:
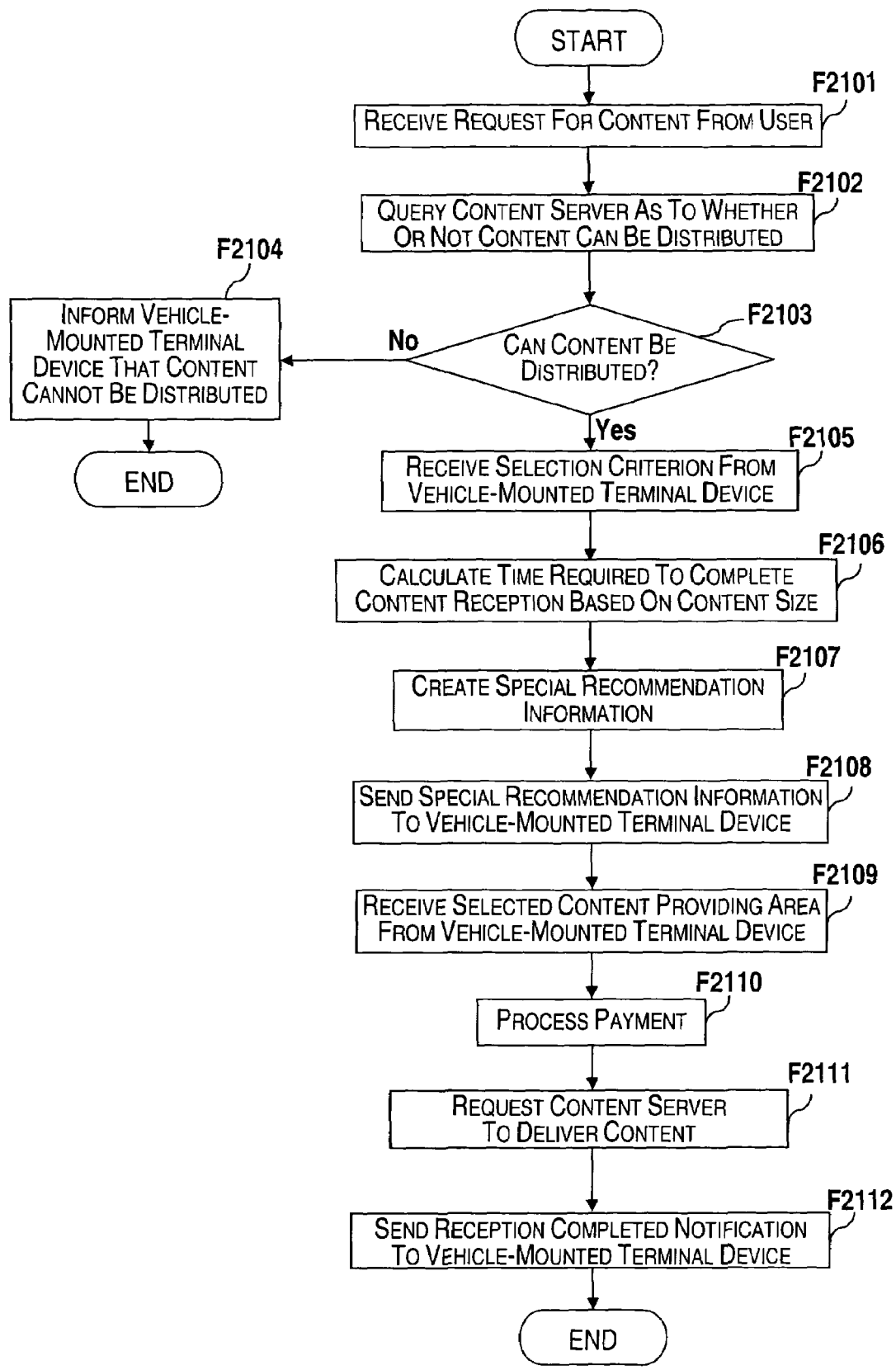
FIG. 21 is a flowchart showing information processing steps executed by a center system of the content providing area presentation system in accordance with the sixth embodiment of the present invention.

The processing flow of the center system 1950 will now be described referring to FIG. 21. FIG. 21 is a flowchart showing the information processing steps executed by the center system 1950 in accordance with the sixth embodiment of the present invention.

First, in step F2101, the management server 1953 of the center system 1950 is configured and arranged to receive a content request for the content from the vehicle-mounted terminal device 1900 of the user. Then, the management server 1953 is further configured and arranged to query the content server 1955a or 1955b regarding whether or not the requested content can be distributed in step F2102. If it is not possible to distribute the content in step F2103, the management server 1953 is configured and arranged to inform the vehicle-mounted terminal device 1900 that the content cannot be distributed in step F2104.

If the management server 1953 is informed in step F2103 that the requested content is possible to be distributed, the management server 1953 is configured and arranged to receive the selection criterion for the content providing areas from the vehicle-mounted terminal device 1900 in step F2105. In this embodiment, the selection criterion is set to list content providing area candidates that are suitable in view of the download time. Therefore, upon receiving the selection criterion, the download time accommodation processing storage device 1959 installed together with the management server 1953 is used to determine the content receiving time according to the size of the content to be downloaded in step F2106. Based on the investigation results in step F2106, the management server 1953 is configured to create special recommendation information that list the content providing area candidates that are suitable in view of the download time in step F2107. For example, if the size of the file to be downloaded is large, the user might be guided to a café where the user can fill in the time by drinking coffee while waiting for the download. At the same time, in step F2107, the management server 1953 is also configured and arranged to create a straight-line distance list that lists the content providing area candidates in order from the shortest straight-line distance to the farthest straight-line distance from the current position of the vehicle.

Next, the management server 1953 is configured and arranged to report the special recommendation information created in step F2107 to the vehicle-mounted terminal device 1900 in step F2108. Then, the management server 1953 is configured and arranged to receive a result of the selection of the content providing area by the user from the vehicle-mounted terminal device 1900 in step F2109. In step F2110, a payment processing is executed. In step F2111, the management server is configured and arranged to request the content server 1955a or 1955b to distribute the content. Then, in step F2112, the management server 1953 is configured and arranged to send a notification to the vehicle-mounted terminal 1900 informing that reception of the request by the user has been completed.

Figure 22:
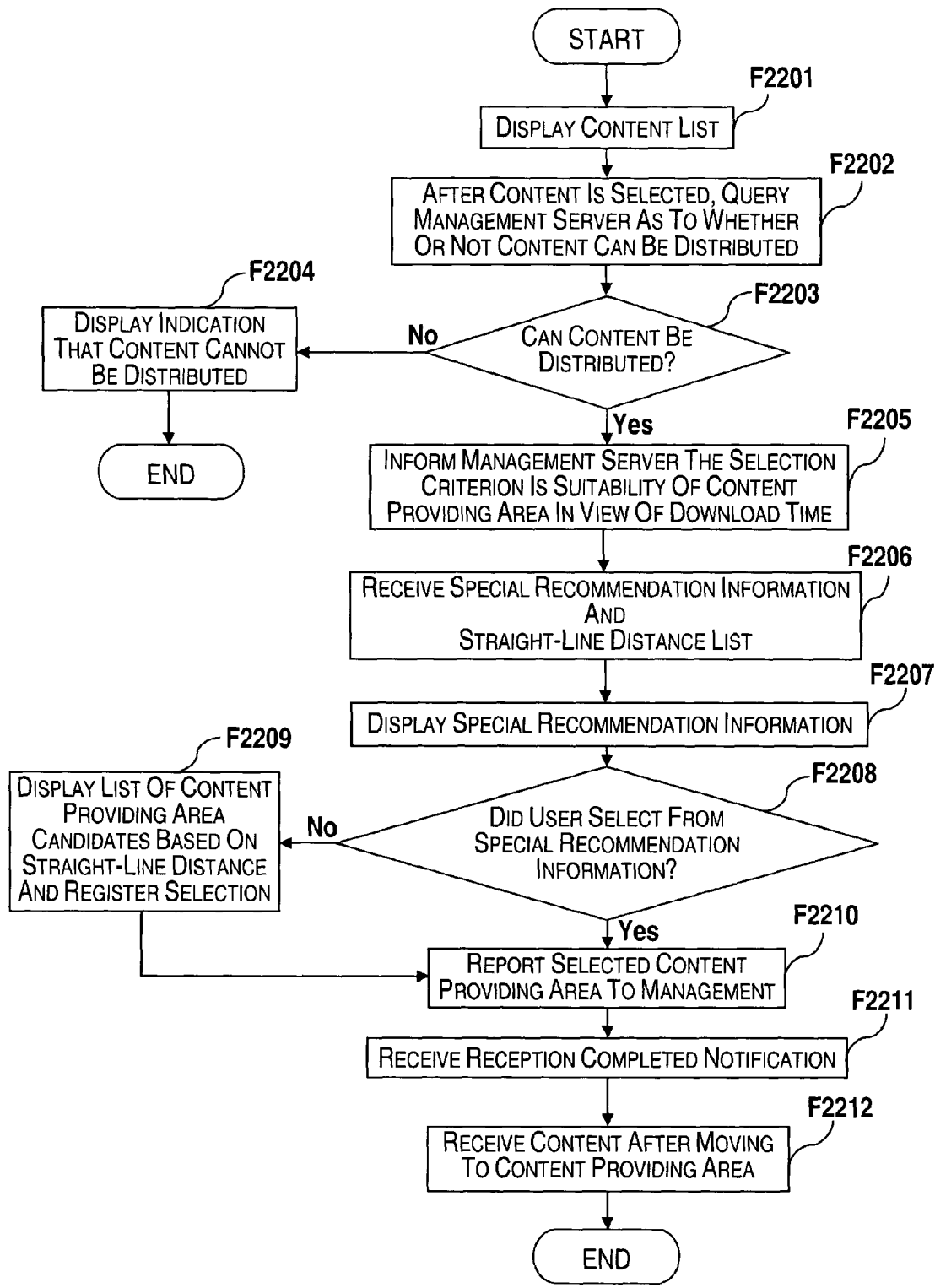
FIG. 22 is a flowchart showing information processing steps executed by the vehicle-mounted terminal device of the content providing area presentation system in accordance with the sixth embodiment of the present invention.

Next, the processing flow of the vehicle-mounted terminal device 1900 will be explained referring to FIG. 22. FIG. 22 is a flowchart showing the information processing steps executed by the vehicle-mounted terminal device 1900 in accordance with the sixth embodiment of the present invention.

First, in step F2201 of FIG. 22, the vehicle-mounted terminal device 1900 is configured and arranged to display a content list on the displaying section 1911. The user selects the desired content from the displayed content list. After the content has been selected, the vehicle-mounted terminal device 1900 is configured and arranged to query the management server 1953 as to whether or not the selected content can be distributed in step F2202.

If the vehicle-mounted terminal device 1900 receives a notification from the management server 1953 that the requested content cannot be distributed in step F2203, the vehicle-mounted terminal device 1900 is configured and arranged to display an indication that the content cannot be distributed in step F2204.

If the vehicle-mounted terminal device 1900 is notified in step F2203 that the requested content can be distributed, the vehicle-mounted terminal device 1900 is configured and arranged to inform the management server 1953 that the selection criterion is the suitability of the content providing area in view of the download time in step F2205.

After receiving the selection criterion from the vehicle-mounted terminal device 1900, the management server 1953 is configured and arranged to investigate the download time estimated based on the file size by using the download time accommodation processing storage device 1959 (step F2106 in FIG. 21). Then the management server 1953 is configured and arranged to create the special recommendation information and the straight-line distance list of content providing area candidates (step F2107 in FIG. 21). The management server 1953 is configured and arranged to send the special recommendation information and the straight-line distance list of content providing area candidate to the vehicle terminal device 1900 (step F2108 in FIG. 21).

The vehicle-mounted terminal device 1900 is configured and arranged to receive the special recommendation information and the straight-line distance list of content providing area candidates in step F2206. Then the vehicle-mounted terminal device 1900 is configured and arranged to display the special recommendation information D2003 in the displaying section 1911 in step F2207.

If the user presses the special recommendation information cancel button D2004 in step F2208 without selecting from the special recommendation information D2003 displayed on the displaying section 1911, in step F2209, the vehicle-mounted terminal device 1900 is configured and arranged to display the straight-line distance list of content providing area candidates received in step F2206 on the displaying section 1911.

When the user selects the content providing area from the special recommendation information in step F2208 or from the straight-line distance list of content providing area candidates in step F2209, the vehicle-mounted terminal device 1900 is configured and arranged to notify the management server 1953 which one of the content providing areas was selected in step F2210.

In step F2211, the vehicle-mounted terminal device 1900 is configured and arranged to receive the reception completed notification from the management server 1953. The vehicle-mounted terminal device 1900 is configured and arranged to end the processing when the vehicle goes to the selected content providing area and receives the content at the content providing area in step F2212.

Accordingly, the content providing area presentation system in accordance with the sixth embodiment of the present invention makes it possible for the user to use the download waiting time more effectively when the time required for downloading the content is long.

The embodiments described heretofore were presented in order to facilitate understanding of the present invention. Therefore, these descriptions are not intended to limit the present invention. Accordingly, the various elements disclosed in the embodiments are intended to include all design variations and equivalents that are within the technical scope of the present invention.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2002-272720 and 2003-189553. The entire disclosure of Japanese Patent Application Nos. 2002-272720 and 2003-189553 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A content providing area presentation system comprising:
   a mobile device including
   a user inputting section configured and arranged to request content providing area candidates for presenting at least one of the content providing area candidates to a user based on a selection criterion selected by the user, and
   a displaying section configured and arranged to display the at least one of the content providing area candidates in response to the selection criterion established by the user inputting section based on a current position of the mobile device.

2. The content providing area presentation system as recited in claim 1, wherein
   the selection criterion of the user inputting section is based on traveling route information.

3. The content providing area presentation system as recited in claim 1, wherein
   the selection criterion of the user inputting section is based on vehicle information.

4. The content providing area presentation system as recited in claim 1, wherein
   the selection criterion of the user inputting section is based on time information.

5. The content providing area presentation system as recited in claim 1, wherein
   the selection criterion of the user inputting section is based on content providing area information related to the content providing area candidates.

6. The content providing area presentation system as recited in claim 5, wherein
   the content providing area information is parking lot vacancy information.

7. The content providing area presentation system as recited in claim 5, wherein
   the content providing area information is a processing capacity at each of the content providing area candidates.

8. The content providing area presentation system as recited in claim 1, wherein
   the selection criterion of the user inputting section is based on a distribution preparation time for the content at the content providing area candidates.

9. The content providing area presentation system as recited in claim 1, wherein
   the selection criterion of the user inputting section is based on a download time for the content.

10. A method of presenting content providing area candidates on a mobile device, comprising:
    inputting a content request for content providing area candidates for presenting at least one of the content providing area candidates to a user based on a selection criterion selected by the user; and
    displaying the at least one of the content providing area candidates in accordance with the selection criterion established by the content request based on a current position of the mobile device.

11. A content providing area presentation system comprising:
  user selection means for inputting a content request for content providing area candidates for presenting at least one of the content providing area candidates to a user based on a selection criterion selected by the user; and
  a displaying means for displaying the at least one of the content providing area candidates in response to the selection criterion established by the user selection means and a current position of a mobile device including the user selection means and the displaying means.

12. The content providing area presentation system as recited in claim 3, wherein
  the vehicle information used as the selection criterion of the user inputting section includes weather conditions.

13. The content providing area presentation system as recited in claim 3, wherein
  the vehicle information used as the selection criterion of the user inputting section includes fuel level of a vehicle equipped with the mobile device.

14. The content providing area presentation system as recited in claim 4, wherein
  the displaying section is further configured and arranged to display at least one time accommodating facility associated with the at least one of the content providing area candidates in response to the selection criterion established by the user inputting section.

15. The content providing area presentation system as recited in claim 9 wherein
  the displaying section is further configured and arranged to display at least one time accommodating facility associated with the at least on of the content providing area candidates in response to the selection criterion established by the user inputting section.

16. The content providing area presentation system as recited in claim 1, wherein
  the displaying section includes a display screen of a vehicle navigation system.

17. The content providing area presentation system as recited in claim 1, wherein
  the user inputting section and the displaying section are part of a vehicle navigation system.

18. A content providing area presentation system comprising:
  a mobile device including
    a user inputting section configured and arranged to request content providing area candidates for presenting at least one of the content providing area candidates to a user based on a selection criterion; and
    a displaying section configured and arranged to display the at least one of the content providing area candidates in response to the selection criterion established by the user inputting section and a current position of the mobile device,
    the user inputting section being further configured and arranged to provide a user choice between the at least one of the content providing area candidates displayed by the display section in response to the selection criterion established by the user inputting section and a straight-line route to one of the content providing area candidates that is closest to a vehicle equipped with the mobile device.

19. A content providing area presentation system comprising:
  a mobile device including
    a user inputting section configured and arranged to request content providing area candidates for presenting at least one of the content providing area candidates to a user based on a selection criterion,
    a displaying section configured and arranged to display the at least one of the content providing area candidates in response to the selection criterion established by the user inputting section and a current position of the mobile device;
  a center system including
    a management server being configured and arranged to receive a request for the content providing area candidates from the user inputting section, create a list of the at least one of the content providing areas based on the selection criterion and the current position of the mobile device, and send the list to the mobile device; and
  a vehicle mounted terminal including the mobile device.

* * * * *